(12) United States Patent
Kim et al.

(10) Patent No.: US 11,144,175 B2
(45) Date of Patent: Oct. 12, 2021

(54) RULE BASED APPLICATION EXECUTION USING MULTI-MODAL INPUTS

(71) Applicant: Samsung Electronics Co., Ltd., Suwon-si (KR)

(72) Inventors: Dohyeon Kim, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/299,923

(22) Filed: Mar. 12, 2019

(65) Prior Publication Data
US 2019/0302970 A1 Oct. 3, 2019

(30) Foreign Application Priority Data
Apr. 2, 2018 (KR) .......................... 10-2018-0038307

(51) Int. Cl.
*G06F 3/0482* (2013.01)
*G06F 3/0488* (2013.01)
*G06F 3/16* (2006.01)

(52) U.S. Cl.
CPC ........ *G06F 3/0482* (2013.01); *G06F 3/04883* (2013.01); *G06F 3/167* (2013.01)

(58) Field of Classification Search
CPC .... G06F 3/0482; G06F 3/04883; G06F 3/167; G06F 16/164
See application file for complete search history.

(56) References Cited

U.S. PATENT DOCUMENTS

| 5,600,765 | A | * | 2/1997 | Ando | G06F 3/038 345/668 |
|---|---|---|---|---|---|
| 5,884,249 | A | | 3/1999 | Namba et al. | |
| 7,167,826 | B2 | | 1/2007 | Cho | |
| 9,390,714 | B2 | | 7/2016 | Kim | |
| 9,423,946 | B2 | * | 8/2016 | Moore | G06F 3/0481 |
| 9,990,433 | B2 | | 6/2018 | Kang et al. | |

(Continued)

FOREIGN PATENT DOCUMENTS

| KR | 2003-0004927 A | 1/2003 |
|---|---|---|
| KR | 10-2012-0054743 A | 5/2012 |

(Continued)

OTHER PUBLICATIONS

International Search Report dated Jul. 5, 2019, issued in the International Application No. PCT/KR2019/002828.

*Primary Examiner* — Eric J. Bycer
(74) *Attorney, Agent, or Firm* — Jefferson IP Law, LLP

(57) ABSTRACT

A system is provided. The system includes a microphone, a touchscreen display, at least one processor operatively connected to the microphone and the display, at least one memory operatively connected to the processor. The memory stores instructions that, when executed, cause the processor to receive a user utterance via the microphone, to display a user interface (UI) on the display, to receive a touch or gesture input associated with the UI via the display, to identify at least one item associated with the user interface, based at least partly on the touch or gesture input, to identify an intent based at least partly on the user utterance, to identify at least one parameter using at least part of the at least one item, and to provide a response, based at least partly on the intent and the at least one parameter.

11 Claims, 27 Drawing Sheets

(56) References Cited

U.S. PATENT DOCUMENTS

| | | |
|---|---|---|
| 10,223,466 B2 | 3/2019 | Kang et al. |
| 10,276,157 B2 | 4/2019 | Lynch et al. |
| 2003/0009330 A1 | 1/2003 | Cho |
| 2005/0138219 A1* | 6/2005 | Bou-Ghannam ....... G06F 9/451 710/1 |
| 2005/0237308 A1* | 10/2005 | Autio .................. G06F 3/04883 345/173 |
| 2006/0261982 A1* | 11/2006 | Kong ...................... G06F 3/038 341/22 |
| 2008/0211766 A1* | 9/2008 | Westerman ........ G06K 9/00375 345/156 |
| 2008/0235022 A1* | 9/2008 | Bergl ............................ 704/257 |
| 2008/0282261 A1* | 11/2008 | Bou-Ghannam ....... G06F 9/542 719/315 |
| 2011/0313768 A1* | 12/2011 | Klein ..................... G06F 3/038 704/251 |
| 2012/0075184 A1* | 3/2012 | Madhvanath ........... G10L 15/24 345/161 |
| 2012/0127072 A1 | 5/2012 | Kim |
| 2014/0095167 A1 | 4/2014 | Lynch et al. |
| 2014/0095171 A1 | 4/2014 | Lynch et al. |
| 2015/0339348 A1 | 11/2015 | Joo et al. |
| 2015/0339391 A1 | 11/2015 | Kang et al. |
| 2016/0092074 A1* | 3/2016 | Raux ...................... G06F 3/038 715/781 |
| 2016/0147882 A1 | 5/2016 | Li et al. |
| 2016/0170710 A1 | 6/2016 | Kim et al. |
| 2018/0268068 A1 | 9/2018 | Kang et al. |

FOREIGN PATENT DOCUMENTS

| | | |
|---|---|---|
| KR | 10-1650769 B1 | 8/2016 |
| KR | 10-2017-0059652 A | 5/2017 |

* cited by examiner

RULE BASED APPLICATION EXECUTION USING MULTI-MODAL INPUTS

CROSS-REFERENCE TO RELATED APPLICATION(S)

This application is based on and claims priority under 35 U.S.C. § 119(a) of a Korean patent application number 10-2018-0038307, filed on Apr. 2, 2018, in the Korean Intellectual Property Office, the disclosure of which is incorporated by reference herein in its entirety.

BACKGROUND

1. Field

The disclosure relates to an application execution method and an electronic device supporting the same.

2. Description of Related Art

Electronic devices, such as a smartphone, a tablet personal computer (PC), a laptop PC, a desktop PC, and a wearable device (e.g., a smart watch) may receive a user input in various manners. The electronic devices may provide a keyboard, a mouse, a touch pen or touch pad, a touch input, a keyboard input, and a mouse input. In recent years, the electronic devices operating by an interactive voice command with a user are being released.

The above information is presented as background information only to assist with an understanding of the disclosure. No determination has been made, and no assertion is made, as to whether any of the above might be applicable as prior art with regard to the disclosure.

SUMMARY

When the electronic device of the related art launches an intelligent app (or an interactive app, an interactive command app, or a voice recognition interface) (e.g., Bixby® or Siri®), the electronic device of the related art supports only one input method (either a voice input or a touch input). As a result, when one input method is activated, the other input method is inactivated. When a user enters a command using only voice, the utterance time may become longer and the utterance content may become complicated.

When there is no essential parameter in a voice command of a user, the electronic device may require an additional input or may perform another operation different from the user's intent, thereby causing inconvenience to the user.

Aspects of the disclosure are to address at least the above-mentioned problems and/or disadvantages and to provide at least the advantages described below. Accordingly, an aspect of the disclosure is to provide an apparatus and a method for an application execution method and an electronic device supporting the same.

Additional aspects will be set forth in part in the description which follows and, in part, will be apparent from the description, or may be learned by practice of the presented embodiments.

In accordance with an aspect of the disclosure, a system is provided. The system includes a microphone, a touchscreen display, at least one processor operatively connected to the microphone and the display, at least one memory operatively connected to the processor. The memory may store instructions that, when executed, cause the processor to receive a user utterance via the microphone, to display a user interface (UI) on the display, to receive a touch or gesture input associated with the UI via the display, to identify at least one item associated with the user interface, based at least partly on the touch or gesture input, to identify an intent based at least partly on the user utterance, to identify at least one parameter using at least part of the at least one item, and to provide a response, based at least partly on the intent and the at least one parameter.

In accordance with another aspect of the disclosure, an electronic device is provided. The electronic device includes a microphone, a display configured to operate as a touchscreen, a communication circuit configured to transmit or receive data to or from an external server, a memory, and a processor. The processor is configured to receive a part of an utterance input based on a user voice received via the microphone, at a first time, receive a first auxiliary input via the display or an external input device, within a specified time interval from the first time, identify at least one first item associated with the part of the utterance input, based on the first auxiliary input, identify a rule associated with execution of one or more applications based on the utterance input and the first item, and execute the one or more applications based on the rule.

In accordance with another aspect of the disclosure, an application executing method performed in an electronic device is provided. The method includes receiving a part of an utterance input based on a user voice received via a microphone, at a first time, receiving a first auxiliary input via a display or an external input device, within a specified time interval from the first time, determining at least one first item associated with the part of the utterance input, based on the first auxiliary input, identifying a rule associated with execution of one or more applications based on the utterance input and the first item, and executing the one or more applications based on the rule.

In accordance with another aspect of the disclosure, a recording medium recording instructions of a method executable by a processor of an electronic device is provided. The instructions cause the processor to perform receiving a part of an utterance input based on a user voice received via a microphone of the electronic device, at a first time, receiving a first auxiliary input via a display or an external input device, within a specified time interval from the first time, determining at least one first item associated with the part of the utterance input, based on the first auxiliary input, identifying a rule associated with execution of one or more applications based on the utterance input and the first item, and executing the one or more applications based on the rule.

In accordance with another aspect of the disclosure, advantages, and salient features of the disclosure will become apparent to those skilled in the art from the following detailed description, which, taken in conjunction with the annexed drawings, discloses various embodiments of the disclosure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 is a screen view in which an item is identified using a layout of a UI being displayed on a display according to an embodiment of the disclosure;

FIG. 13B is a view of an auxiliary input using a touch pen according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
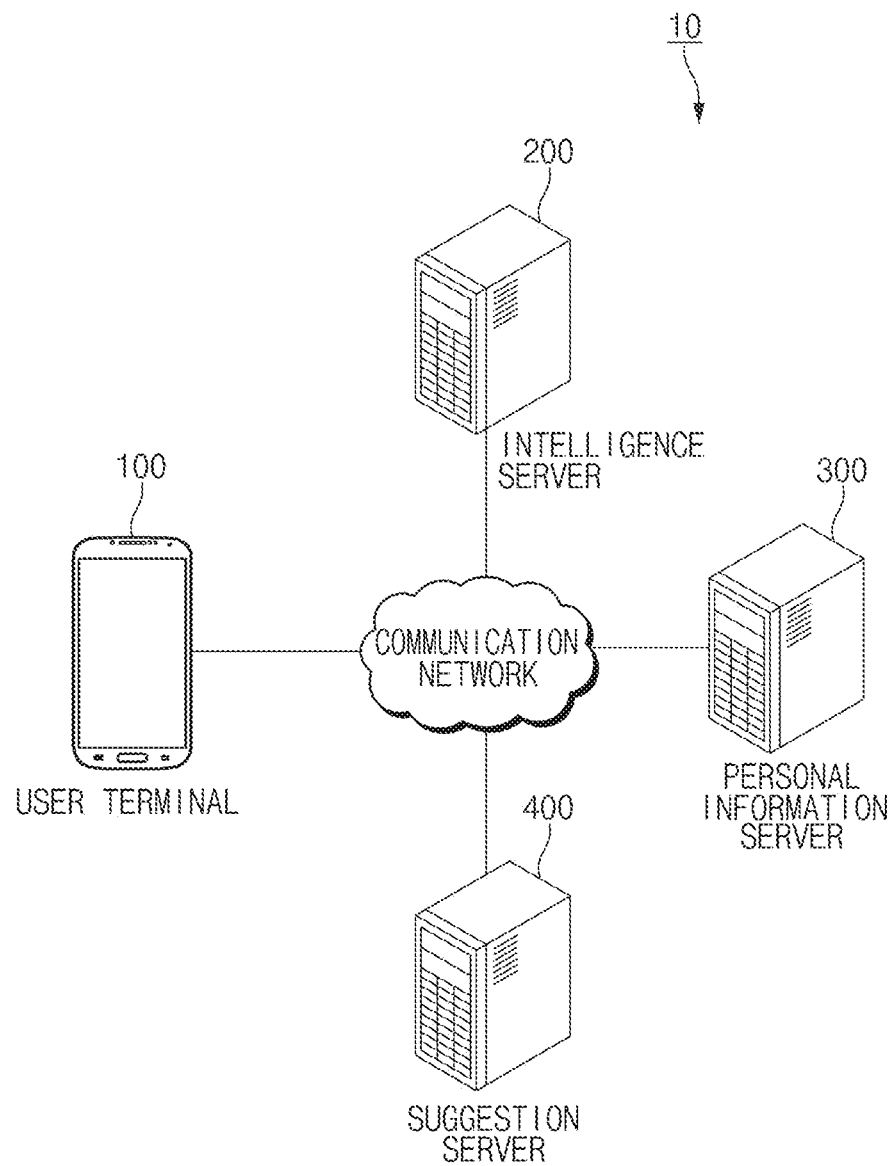
FIG. 1 is a view illustrating an integrated intelligent system according to an embodiment of the disclosure.

FIG. 1 is a view illustrating an integrated intelligent system, according to an embodiment of the disclosure.

Referring to FIG. 1, an integrated intelligent system 10 may include a user terminal 100, an intelligence server 200, a personal information server 300, or a suggestion server 400.

The user terminal 100 may provide a service for a user through an app (or an application program) (e.g., an alarm app, a message app, a picture (gallery) app, or the like) stored in the user terminal 100. For example, the user terminal 100 may launch and operate another app through an intelligence app (or speech recognition app) stored in the user terminal 100. The user terminal 100 may receive a user input for launching or operating the other app through the intelligence app. For example, the user input may be received through a physical button, a touch pad, a voice input, a remote input, or the like. According to an embodiment, various types of terminal devices (or an electronic device), which are connected with Internet, such as a mobile phone, a smartphone, personal digital assistant (PDA), a notebook computer, and the like may correspond to the user terminal 100.

According to an embodiment, the user terminal 100 may receive user utterance as a user input. The user terminal 100 may receive the user utterance and may generate a command for operating an app based on the user utterance. As such, the user terminal 100 may operate the app by using the command.

The intelligence server 200 may receive a voice input of a user from the user terminal 100 over a communication network and may convert the voice input to text data. In another embodiment, the intelligence server 200 may generate (or select) a path rule based on the text data. The path rule may include information about an action (or an operation) for performing the function of an app or information about a parameter utilized to perform the action. In addition, the path rule may include the order of the action of the app. The user terminal 100 may receive the path rule, may select an app depending on the path rule, and may execute the action included in the path rule in the selected app.

Generally, the term "path rule" of the disclosure may indicate, but is not limited to, the sequence of states in which an electronic device performs the task requested by the user. In other words, the path rule may include information about the sequence of the states. For example, the task may be a certain action that the intelligence app is capable of providing. The task may include the generation of a schedule, the transmission of a picture to the desired other party, or the provision of weather information. The user terminal 100 may perform the task by sequentially having at least one or more states (e.g., an operating state of the user terminal 100).

According to an embodiment, the path rule may be provided or generated by an artificial intelligent (AI) system. The AI system may be a rule-based system, or may be a neural network-based system (e.g., a feed forward neural network (FNN) or a recurrent neural network (RNN)). Alternatively, the AI system may be a combination of the above-described systems or an AI system different from the above-described system. According to an embodiment, the path rule may be selected from a set of predefined path rules or may be generated in real time in response to a user request. For example, the AI system may select at least a path rule of predefined plurality of path rules, or may generate a path rule dynamically (or in real time). Furthermore, the user terminal 100 may use a hybrid system to provide the path rule.

According to an embodiment, the user terminal 100 may execute the action and may display a screen corresponding to a state of the user terminal 100, which executes the action, in a display. For another example, the user terminal 100 may execute the action and may not display the result obtained by executing the action in the display. For example, the user terminal 100 may execute a plurality of actions and may display the result of a part of the plurality of actions in the display. For example, the user terminal 100 may display the result, which is obtained by executing the last action, in the display. For another example, the user terminal 100 may receive the user input to display the result obtained by executing the action in the display.

The personal information server 300 may include a database in which user information is stored. For example, the personal information server 300 may receive the user information (e.g., context information, information about execution of an app, or the like) from the user terminal 100 and may store the user information in the database. The intelligence server 200 may receive the user information from the personal information server 300 over the communication network and may use the user information when generating a path rule associated with the user input. According to an embodiment, the user terminal 100 may receive the user information from the personal information server 300 over the communication network, and may use the user information as information for managing the database.

The suggestion server 400 may include a database storing information about a function in a terminal, introduction of an application, or a function to be provided. For example, the suggestion server 400 may receive the user information of the user terminal 100 from the personal information server 300 and may include the database storing information about a function that a user is capable of utilizing. The user terminal 100 may receive information about the function to be provided from the suggestion server 400 over the communication network and may provide the received information to the user.

Figure 2:
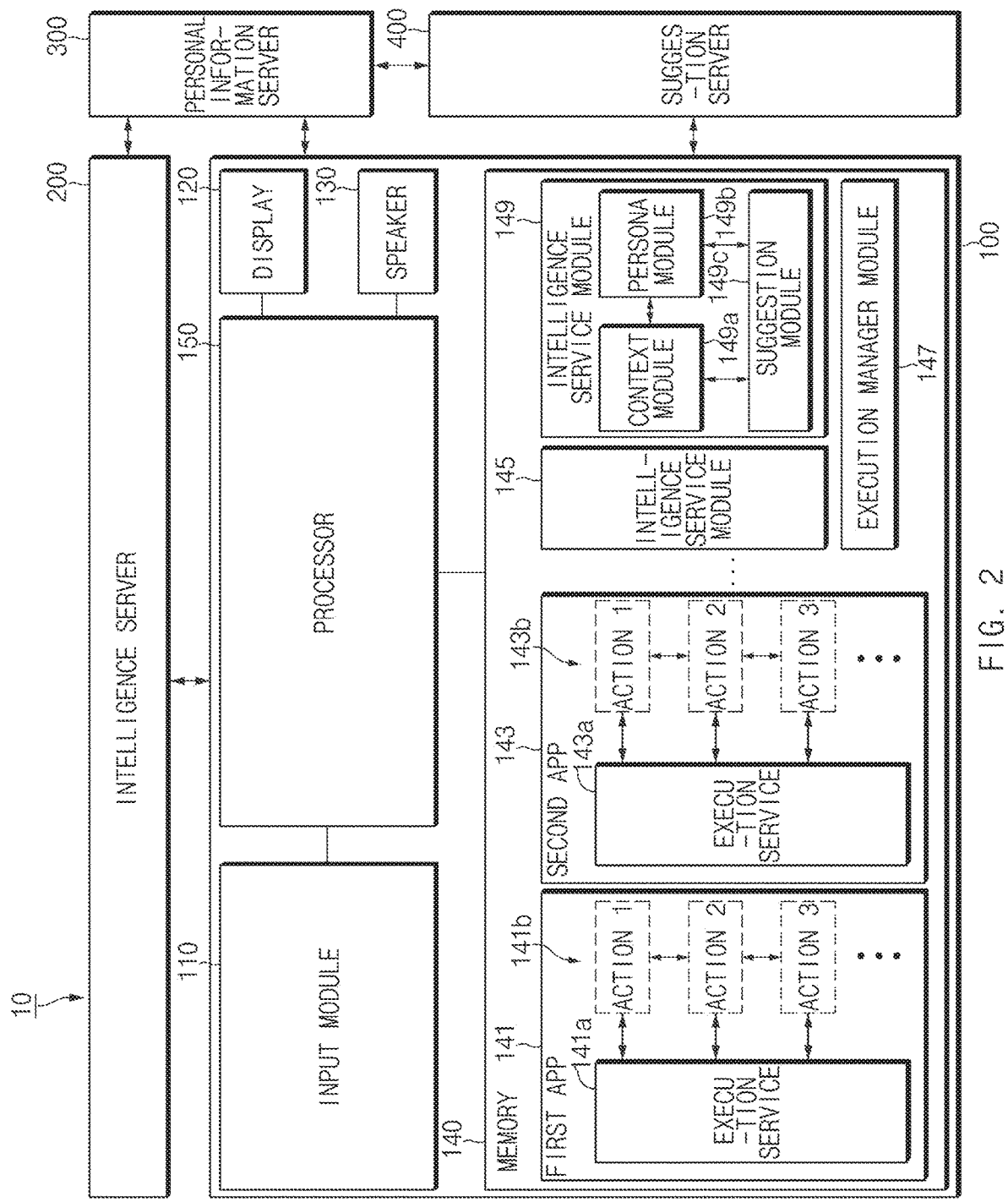
FIG. 2 is a block diagram illustrating a user terminal of an integrated intelligent system according to an embodiment of the disclosure.

FIG. 2 is a block diagram illustrating a user terminal of an integrated intelligent system, according to an embodiment of the disclosure.

Referring to FIG. 2, the user terminal 100 may include an input module 110, a display 120, a speaker 130, a memory 140, or a processor 150. The user terminal 100 may further include a housing, and elements of the user terminal 100 may be seated in the housing or may be positioned on the housing. The user terminal 100 may further include a communication circuit positioned in the housing. The user terminal 100 may transmit or receive data (or information) to or from an external server (e.g., the intelligence server 200) through the communication circuit.

According to an embodiment, the input module 110 may receive a user input from a user. For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) placed in the user terminal 100 (or the housing of the user terminal 100).

According to an embodiment, the input module 110 may include a microphone that is capable of receiving the utterance of the user as a sound signal. For example, the input module 110 may include a speech input system and may receive the utterance of the user as a sound signal through the speech input system. For example, the microphone may be exposed through a part (e.g., a first portion) of the housing.

According to an embodiment, the display 120 may display an image, a video, and/or an execution screen of an application. For example, the display 120 may display a graphic user interface (GUI) of an app. According to an embodiment, the display 120 may be exposed to a part (e.g., a second part) of the housing.

According to an embodiment, the speaker 130 may output the sound signal. For example, the speaker 130 may output the voice signal generated in the user terminal 100 to the outside. According to an embodiment, the speaker 130 may be exposed to a part (e.g., a third part) of the housing.

According to an embodiment, the memory 140 may store a plurality of apps (or application program) 141 and 143. For example, the plurality of apps 141 and 143 may be a program for performing a function corresponding to the user input. According to an embodiment, the memory 140 may store an intelligence agent 145, an execution manager module 147, or an intelligence service module 149. For example, the intelligence agent 145, the execution manager module 147 and the intelligence service module 149 may be a framework (or application framework) for processing the received user input (e.g., user utterance).

According to an embodiment, the memory 140 may include a database capable of storing information utilized to recognize the user input. For example, the memory 140 may include a log database capable of storing log information. For example, the memory 140 may include a persona database capable of storing user information.

According to an embodiment, the memory 140 may store the plurality of apps 141 and 143, and the plurality of apps 141 and 143 may be loaded to operate. For example, the plurality of apps 141 and 143 stored in the memory 140 may operate after being loaded by the execution manager module 147. The plurality of apps 141 and 143 may include execution service modules 141a and 143a performing a function. In an embodiment, the plurality of apps 141 and 143 may perform a plurality of actions (e.g., a sequence of states) 141b and 143b through execution service modules 141a and 143a for the purpose of performing a function. In other words, the execution service modules 141a and 143a may be activated by the execution manager module 147, and then may execute the plurality of actions 141b and 143b.

According to an embodiment, when the actions 141b and 143b of the apps 141 and 143 are executed, an execution state screen according to the execution of the actions 141b and 143b may be displayed in the display 120. For example, the execution state screen may be a screen in a state where the actions 141b and 143b are completed. As another example, the execution state screen may be a screen in a state where the execution of the actions 141b and 143b is in partial landing (e.g., in the case where a parameter utilized for the actions 141b and 143b are not entered).

According to an embodiment, the execution service modules 141a and 143a may execute the actions 141b and 143b depending on a path rule. For example, the execution service modules 141a and 143a may be activated by the execution manager module 147, may receive an execution request from the execution manager module 147 depending on the path rule, and may execute functions of the apps 141 and 143 by performing the actions 141b and 143b depending on the execution request. When the execution of the actions 141b and 143b is completed, the execution service modules 141a and 143a may transmit completion information to the execution manager module 147.

According to an embodiment, in the case where the plurality of the actions 141b and 143b are respectively executed in the apps 141 and 143, the plurality of the actions 141b and 143b may be sequentially executed. When the execution of one action (e.g., action 1 of the first app 141 or action 1 of the second app 143) is completed, the execution service modules 141a and 143a may open the next action (e.g., action 2 of the first app 141 or action 2 of the second app 143) and may transmit the completion information to the execution manager module 147. Here, it is understood that opening an arbitrary action is to change a state of the arbitrary action to an executable state or to prepare the execution of the action. In other words, when the arbitrary action is not opened, the corresponding action may be not executed. When the completion information is received, the execution manager module 147 may transmit the execution request associated with the next action (e.g., action 2 of the first app 141 or action 2 of the second app 143) to the execution service modules 141a and 143a. According to an embodiment, in the case where the plurality of apps 141 and 143 are launched, the plurality of apps 141 and 143 may be sequentially launched. For example, when receiving the completion information after the execution of the last action (e.g., action 3 of the first app 141) of the first app 141 is executed, the execution manager module 147 may transmit the execution request of the first action (e.g., action 1 of the second app 143) of the second app 143 to the execution service module 143a.

According to an embodiment, in the case where the plurality of the actions 141b and 143b are executed in the apps 141 and 143, a result screen according to the execution of each of the executed plurality of the actions 141b and 143b may be displayed in the display 120. According to an embodiment, a part of a plurality of result screens according to the executed plurality of the actions 141b and 143b may be displayed in the display 120.

According to an embodiment, the memory 140 may store an intelligence app (e.g., a speech recognition app) operating in conjunction with the intelligence agent 145. The app operating in conjunction with the intelligence agent 145 may receive and process the utterance of the user as a voice signal. According to an embodiment, the app operating in conjunction with the intelligence agent 145 may be operated by a specific input (e.g., an input through a hardware key, an input through a touch screen, or a specific voice input) input through the input module 110.

According to an embodiment, the intelligence agent 145, the execution manager module 147, or the intelligence service module 149 stored in the memory 140 may be performed by the processor 150. The functions of the intelligence agent 145, the execution manager module 147, or the intelligence service module 149 may be implemented by the processor 150. It is described that the function of each of the intelligence agent 145, the execution manager module 147, and the intelligence service module 149 is the operation of the processor 150. According to an embodiment, the intelligence agent 145, the execution manager module 147, or the intelligence service module 149 stored in the memory 140 may be implemented with hardware as well as software.

According to an embodiment, the processor 150 may control overall actions of the user terminal 100. For example, the processor 150 may control the input module 110 to receive the user input. The processor 150 may control the display 120 to display an image. The processor 150 may control the speaker 130 to output the voice signal. The processor 150 may control the memory 140 to execute a program and to read or store information.

In an embodiment, the processor 150 may execute the intelligence agent 145, the execution manager module 147, or the intelligence service module 149 stored in the memory 140. As such, the processor 150 may implement the function of the intelligence agent 145, the execution manager module 147, or the intelligence service module 149.

According to an embodiment, the processor 150 may execute the intelligence agent 145 to generate a command for launching an app based on the voice signal received as the user input. According to an embodiment, the processor 150 may execute the execution manager module 147 to launch the apps 141 and 143 stored in the memory 140 depending on the generated command According to an embodiment, the processor 150 may execute the intelligence service module 149 to manage information of a user and may process a user input by using the information of the user.

The processor 150 may execute the intelligence agent 145 to transmit a user input received through the input module 110 to the intelligence server 200 and may process the user input through the intelligence server 200.

According to an embodiment, before transmitting the user input to the intelligence server 200, the processor 150 may execute the intelligence agent 145 to pre-process the user input. According to an embodiment, to pre-process the user input, the intelligence agent 145 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input and may search for a part in which the user voice is present, by using the detected end-point. The AGC module may recognize the user input and may adjust the volume of the user input so as to be suitable to process the recognized user input. According to an embodiment, the processor 150 may execute all the pre-processing elements for performance. However, in another embodiment, the processor 150 may execute a part of the pre-processing elements to operate at low power.

According to an embodiment, the intelligence agent 145 may execute a wakeup recognition module stored in the memory 140 for the purpose of recognizing a call of a user. As such, the processor 150 may recognize the wakeup command of a user through the wakeup recognition module and may execute the intelligence agent 145 for receiving user input when receiving the wakeup command. The wakeup recognition module may be implemented with a low-power processor (e.g., a processor included in an audio codec). According to an embodiment, when receiving a user input through a hardware key, the processor 150 may execute the intelligence agent 145. In the case where the intelligence agent 145 is executed, an intelligence app (e.g., a speech recognition app) operating in conjunction with the intelligence agent 145 may be executed.

According to an embodiment, the intelligence agent 145 may include an utterance recognition module for performing the user input. The processor 150 may recognize the user input for executing an action in an app through the utterance recognition module. For example, the processor 150 may recognize a limited user (voice) input (e.g., an utterance such as "click" for performing a capture operation when a camera app is being executed) for performing an action such as the wakeup command in the apps 141 and 143 through the utterance recognition module. For example, the processor 150 may assist the intelligence server 200 to recognize and rapidly process a user command capable of being processed in the user terminal 100 through the utterance recognition module. According to an embodiment, the utterance recognition module of the intelligence agent 145 for executing a user input may be implemented in an app processor.

According to an embodiment, the utterance recognition module (including the utterance recognition module of a wake up module) of the intelligence agent 145 may recognize the user input by using an algorithm for recognizing a voice. For example, the algorithm for recognizing the voice may be at least one of a hidden markov model (HMM) algorithm, an artificial neural network (ANN) algorithm, or a dynamic time warping (DTW) algorithm.

According to an embodiment, the processor 150 may execute the intelligence agent 145 to convert the voice input of the user into text data. For example, the processor 150 may transmit the voice of the user to the intelligence server 200 through the intelligence agent 145 and may receive the text data corresponding to the voice of the user from the intelligence server 200. As such, the processor 150 may display the converted text data in the display 120.

According to an embodiment, the processor 150 may execute the intelligence agent 145 to receive a path rule from the intelligence server 200. According to an embodiment, the processor 150 may transmit the path rule to the execution manager module 147 through the intelligence agent 145.

According to an embodiment, the processor 150 may execute the intelligence agent 145 to transmit the execution result log according to the path rule received from the intelligence server 200 to the intelligence service module 149, and the transmitted execution result log may be accumulated and managed in preference information of the user of a persona module 149b.

According to an embodiment, the processor 150 may execute the execution manager module 147, may receive the path rule from the intelligence agent 145, and may execute the apps 141 and 143; and the processor 150 may allow the apps 141 and 143 to execute the actions 141b and 143b included in the path rule. For example, the processor 150 may transmit command information (e.g., path rule information) for executing the actions 141b and 143b to the apps 141 and 143, through the execution manager module 147; and the processor 150 may receive completion information of the actions 141b and 143b from the apps 141 and 143.

According to an embodiment, the processor 150 may execute the execution manager module 147 to transmit the command information (e.g., path rule information) for executing the actions 141b and 143b of the apps 141 and 143 between the intelligence agent 145 and the apps 141 and 143. The processor 150 may bind the apps 141 and 143 to be executed depending on the path rule through the execution manager module 147 and may transmit the command information (e.g., path rule information) of the actions 141b and 143b included in the path rule to the apps 141 and 143. For example, the processor 150 may sequentially transmit the actions 141b and 143b included in the path rule to the apps 141 and 143, through the execution manager module 147 and may sequentially execute the actions 141b and 143b of the apps 141 and 143 depending on the path rule.

According to an embodiment, the processor 150 may execute the execution manager module 147 to manage execution states of the actions 141b and 143b of the apps 141 and 143. For example, the processor 150 may receive information about the execution states of the actions 141b and 143b from the apps 141 and 143, through the execution manager module 147. For example, in the case where the execution states of the actions 141b and 143b are in partial landing (e.g., in the case where a parameter utilized for the actions 141b and 143b are not input), the processor 150 may transmit information about the partial landing to the intelligence agent 145, through the execution manager module 147. The processor 150 may make a request for an input of information (e.g., parameter information) to the user by using the received information through the intelligence agent 145. In another example, in the case where the execution state of each of the actions 141b and 143b is an operating state, the processor 150 may receive an utterance from the user through the intelligence agent 145. The processor 150 may transmit information about the apps 141 and 143 being executed and the execution states of the apps 141 and 143 to the intelligence agent 145, through the execution manager module 147. The processor 150 may transmit the user utterance to the intelligence server 200 through the intelligence agent 145. The processor 150 may receive parameter information of the utterance of the user from the intelligence server 200 through the intelligence agent 145. The processor 150 may transmit the received parameter information to the execution manager module 147 through the intelligence agent 145. The execution manager module 147 may change a parameter of each of the actions 141*b* and 143*b* to a new parameter by using the received parameter information.

According to an embodiment, the processor 150 may execute the execution manager module 147 to transmit parameter information included in the path rule to the apps 141 and 143. In the case where the plurality of apps 141 and 143 are sequentially executed depending on the path rule, the execution manager module 147 may transmit the parameter information included in the path rule from one app to another app.

According to an embodiment, the processor may execute the execution manager module 147 to receive a plurality of path rules. The processor 150 may receive a plurality of path rules through the execution manager module 147 based on the utterance of a user. For example, in the case where the user utterance specifies one app 141 executing one action 141*b* but does not specify the other app 143 executing the other action 143*b*, the processor 150 may receive a plurality of different path rules, in which the same app 141 (e.g., gallery app) executing the one action 141*b* is executed and in which the different app 143 (e.g., message app or Telegram app) executing the other action 143*b* is executed, through the execution manager module 147. For example, the processor 150 may execute the same actions 141*b* and 143*b* (e.g., the same successive actions 141*b* and 143*b*) of the plurality of path rules, through the execution manager module 147. In the case where the execution manager module 147 executes the same action, the processor 150 may display a state screen for selecting the different apps 141 and 143 respectively included in the plurality of path rules in the display 120, through the execution manager module 147.

According to an embodiment, the intelligence service module 149 may include a context module 149*a*, the persona module 149*b*, or a suggestion module 149*c*.

The processor 150 may execute the context module 149*a* to collect current states of the apps 141 and 143 from the apps 141 and 143. For example, the processor 150 may execute the context module 149*a* to receive context information indicating the current states of the apps 141 and 143 and may collect the current states of the apps 141 and 143 through the received context information.

The processor 150 may execute the persona module 149*b* to manage personal information of the user utilizing the user terminal 100. For example, the processor 150 may execute the persona module 149*b* to collect usage information and the execution result of the user terminal 100 and may manage the personal information of the user by using the collected usage information and the collected execution result of the user terminal 100.

The processor 150 may execute the suggestion module 149*c* to predict the intent of the user and may recommend a command to the user based on the intent of the user. For example, the processor 150 may execute the suggestion module 149*c* to recommend a command to the user depending on the current state (e.g., a time, a place, a situation, or an app) of the user.

Figure 3:
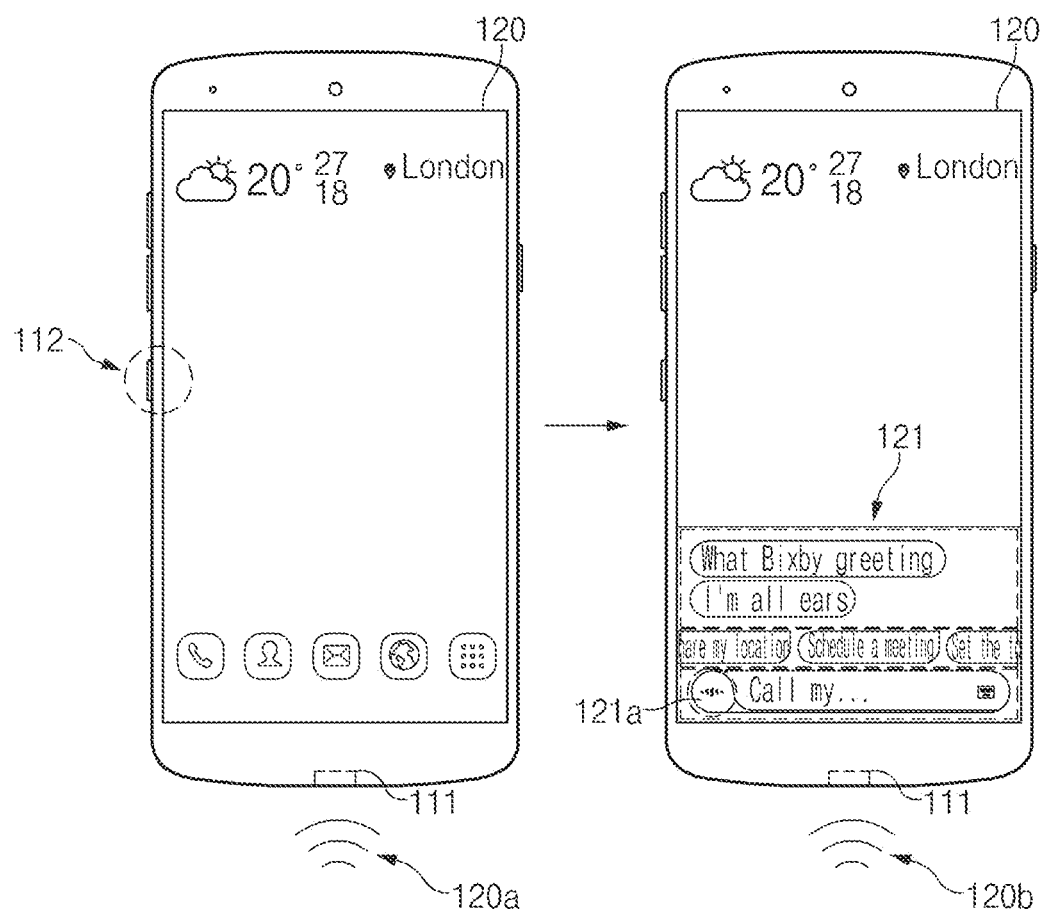
FIG. 3 is a view illustrating that an intelligent app of a user terminal is executed according to an embodiment of the disclosure.

FIG. 3 is a view illustrating that an intelligence app of a user terminal is executed, according to an embodiment of the disclosure.

Referring to FIG. 3 the user terminal 100 receives a user input to execute an intelligence app (e.g., a speech recognition app) operating in conjunction with the intelligence agent 145.

According to an embodiment, the user terminal 100 may execute the intelligence app for recognizing a voice through a hardware key 112. For example, in the case where the user terminal 100 receives the user input through the hardware key 112, the user terminal 100 may display a UI 121 of the intelligence app in the display 120. For example, a user may touch a speech recognition button 121*a* to the UI 121 of the intelligence app for the purpose of entering a voice 120*b* in a state where the UI 121 of the intelligence app is displayed in the display 120. For another example, the user may continuously press the hardware key 112 to enter the voice 120*b*.

According to an embodiment, the user terminal 100 may execute the intelligence app for recognizing a voice through a microphone 111. For example, in the case where a specified voice (e.g., wake up!) is entered 120*a* through the microphone 111, the user terminal 100 may display the UI 121 of the intelligence app in the display 120.

Figure 4:
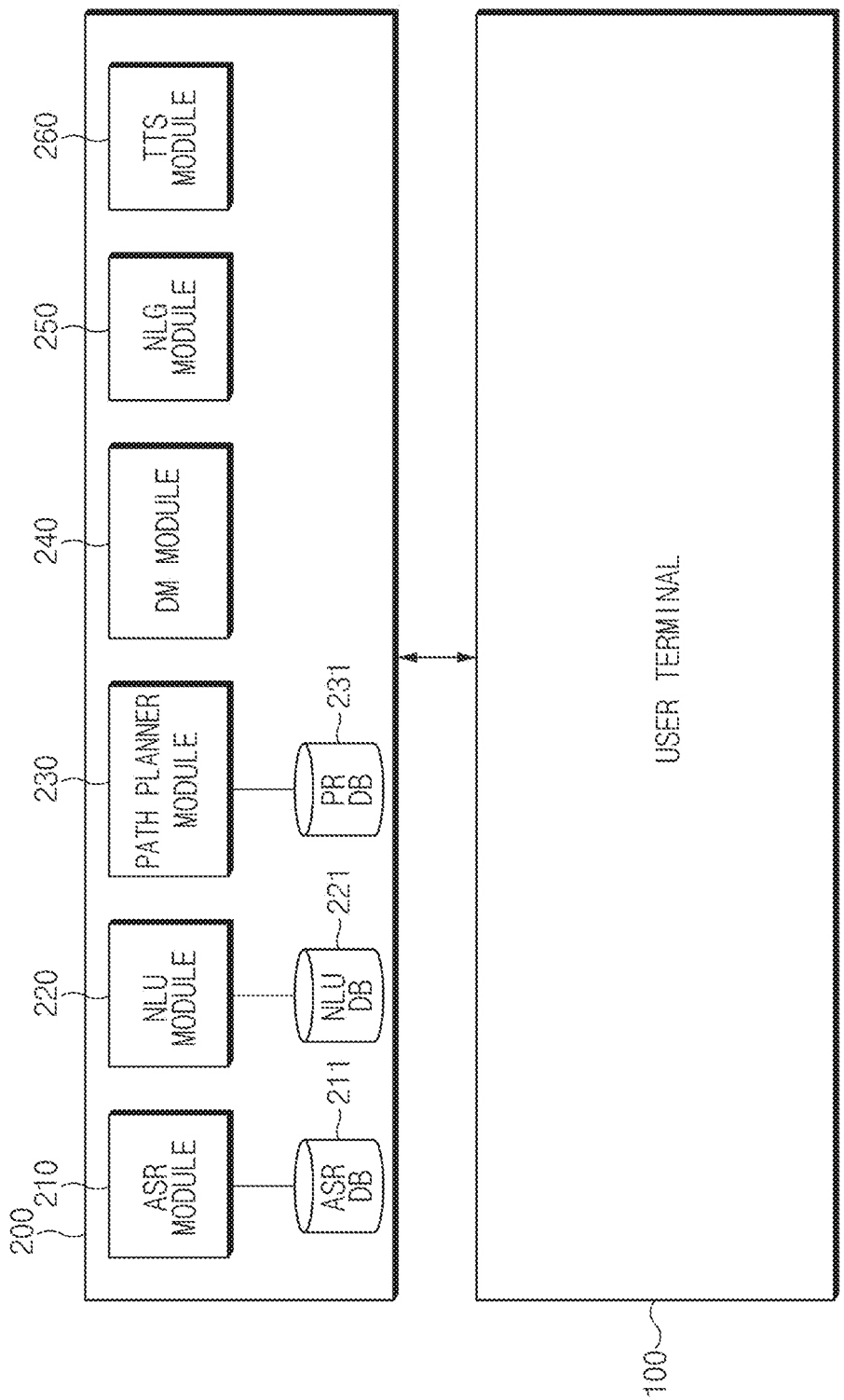
FIG. 4 is a block diagram illustrating an intelligence server of an integrated intelligent system according to an embodiment of the disclosure.

FIG. 4 is a block diagram illustrating an intelligence server of an integrated intelligent system, according to an embodiment of the disclosure.

Referring to FIG. 4, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260. According to an embodiment, the intelligence server 200 may include a communication circuit, a memory, and a processor. The processor may execute an instruction stored in the memory to drive the ASR module 210, the NLU module 220, the path planner module 230, the DM module 240, the NLG module 250, and the TTS module 260. The intelligence server 200 may transmit or receive data (or information) to or from an external electronic device (e.g., the user terminal 100) through the communication circuit.

The NLU module 220 or the path planner module 230 of the intelligence server 200 may generate a path rule.

According to an embodiment, the ASR module 210 may convert the user input (e.g., voice data) received from the user terminal 100 to text data. For example, the ASR module 210 may include an utterance recognition module. The utterance recognition module may include an acoustic model and a language model. For example, the acoustic model may include information associated with phonation, and the language model may include unit phoneme information and information about a combination of unit phoneme information. The utterance recognition module may change user speech to text data by using the information associated with phonation and unit phoneme information. For example, the information about the acoustic model and the language model may be stored in an automatic speech recognition database (ASR DB) 211.

According to an embodiment, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) utilized for the user input to express the intent.

According to an embodiment, the NLU module 220 may determine the intent of the user and parameter by using a matching rule that is divided into a domain, intent, and a parameter (or a slot) utilized to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more parameters. The matching rule may be stored in a NLU database (DB) 221.

According to an embodiment, the NLU module 220 may grasp the meaning of words extracted from a user input by using linguistic features (e.g., grammatical elements) such as morphemes, phrases, and the like and may match the meaning of the grasped words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words, which are the basis for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action (e.g., at least one or more states) to be executed in the app, and a parameter utilized to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the action to be executed in the app, and a parameter utilized to execute the action based on the intent of the user input and the parameter for the purpose of generating one path rule or a plurality of path rules. For example, by using information of the user terminal 100, the NLU module 220 may arrange the app to be executed and the action to be executed in the app depending on the intent of the user input in the form of ontology or a graph model for the purpose of generating the path rule. For example, the generated path rule may be stored in a path rule database (PR DB) 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. For another example, in the case where a part of actions is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 in response to a request for the user input. For example, the NLU module 220 may transmit one path rule corresponding to the user input to the user terminal 100. For another example, the NLU module 220 may transmit the plurality of path rules corresponding to the user input to the user terminal 100. For example, in the case where a part of actions is specified based on the user utterance, the plurality of path rules may be generated by the NLU module 220.

According to an embodiment, the path planner module 230 may select at least one path rule of the plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., OS information or app information) of the user terminal 100, which is received from the intelligence agent 145, to the NLU module 220. For example, a table stored in the PR DB 231 may be stored for each domain or for each version of the domain.

According to an embodiment, the path planner module 230 may select one path rule or the plurality of path rules from the path rule set to transmit the selected one path rule or the selected plurality of path rules to the NLU module 220. For example, the path planner module 230 may map the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent grasped by the NLU module 220 is definite. For example, the DM module 240 may determine whether the user intent is definite, based on whether the information of a parameter is sufficient. The DM module 240 may determine whether the parameter grasped by the NLU module 220 is sufficient to perform a task. According to an embodiment, in the case where the user intent is not clear, the DM module 240 may perform a feedback for making a request for information to the user.

For example, the DM module 240 may perform a feedback for making a request for information about the parameter for grasping the user intent.

According to an embodiment, the DM module 240 may include a content provider module. In the case where the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 5:
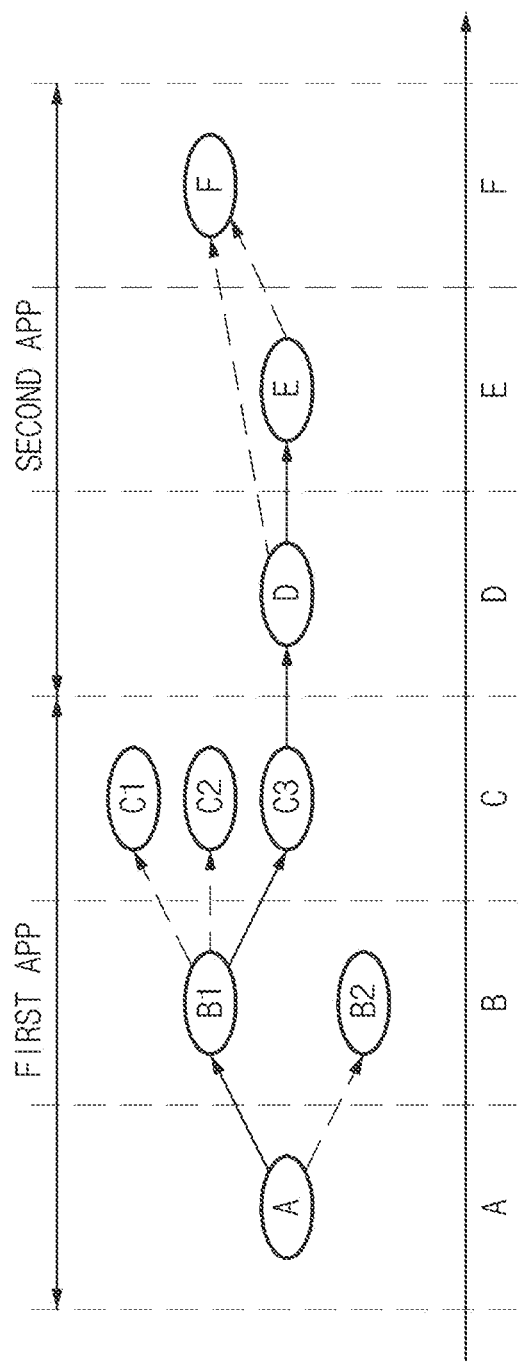
FIG. 5 is a view illustrating a path rule generating method of a natural language understanding (NLU) module according to an embodiment of the disclosure.

FIG. 5 is a diagram illustrating a path rule generating method of a path planner module, according to an embodiment of the disclosure.

Referring to FIG. 5, the NLU module 220 may divide the function of an app into any one action (e.g., state A to state F) and may store the divided unit actions in the PR DB 231. For example, the NLU module 220 may store a path rule set including a plurality of path rules (e.g., A-B1-C1, A-B1-C2, A-B1-C3-D-F, and A-B1-C3-D-E-F) divided into the one action, in the PR DB 231.

The PR DB 231 of the path planner module 230 may store the path rule set for performing the function of an app. The path rule set may include a plurality of path rules each of which includes a plurality of actions (e.g., a sequence of states). An action executed depending on a parameter entered to each of the plurality of actions included in each of the plurality of path rules may be sequentially arranged. The plurality of path rules implemented in a form of ontology or a graph model may be stored in the PR DB 231.

The NLU module 220 may select an optimal path rule (e.g., A-B1-C3-D-F) of the plurality of path rules (e.g., A-B1-C1, A-B1-C2, A-B1-C3-D-F, and A-B1-C3-D-E-F) corresponding to the intent of a user input and the parameter.

Where there is no path rule completely matched to the user input, the NLU module 220 may transmit a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to an embodiment, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 and may transmit the selected one path rule to the user terminal 100.

According to another embodiment, the NLU module 220 may determine the intent of a user and the parameter corresponding to the user input (e.g., an input for selecting C3) additionally entered by the user terminal 100 and may transmit the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to an embodiment, in the case where a user input in which information is insufficient is received by the intelligence server 200, the NLU module 220 may generate a path rule partly corresponding to the received user input. For example, the NLU module 220 may transmit the partly corresponding path rule to the intelligence agent 145. The processor 150 may execute the intelligence agent 145 to receive the path rule and may transmit the partly corresponding path rule to the execution manager module 147. The processor 150 may execute the first app 141 depending on the path rule through the execution manager module 147. The processor 150 may transmit information about an insufficient parameter to the intelligence agent 145 while executing the first app 141 through the execution manager module 147. The processor 150 may make a request for an additional input to a user by using the information about the insufficient parameter, through the intelligence agent 145. When an additional input is received by a user through the intelligence agent 145, the processor 150 may transmit and process a user input to the intelligence server 200. The NLU module 220 may generate a path rule to be added, based on the intent of the user input additionally entered and parameter information and may transmit the path rule to be added, to the intelligence agent 145. The processor 150 may transmit the path rule to the execution manager module 147 through the intelligence agent 145, and may execute the second app 143 depending on the path rule through the execution manager module 147.

According to an embodiment, in the case where a user input, in which a portion of information is missed, is received by the intelligence server 200, the NLU module 220 may transmit a user information request to the personal information server 300. The personal information server 300 may transmit information of a user entering the user input stored in a persona database to the NLU module 220. The NLU module 220 may select a path rule corresponding to the user input in which a part of an action is partly missed, by using the user information. As such, even though the user input in which a portion of information is missed is received by the intelligence server 200, the NLU module 220 may make a request for the missed information to receive an additional input or may determine a path rule corresponding to the user input by using user information.

According to an embodiment, Table 1 attached below may indicate an example form of a path rule associated with a task that a user requests.

TABLE 1

| Path rule ID | State | Parameter |
|---|---|---|
| Gallery_101 | PictureView 25 | NULL |
| | SearchView 26 | NULL |
| | SearchViewResult 27 | Location, time |
| | SearchEmptySelectedView 28 | NULL |
| | SearchSelectedView 29 | ContentType, selectall |
| | CrossShare 30 | anaphora |

Referring to Table 1, a path rule that is generated or selected by the intelligence server 200 depending on user utterance (e.g., "please share a picture") may include at least one state 25, 26, 27, 28, 29 or 30. For example, the at least one state (e.g., one operating state of a terminal) may correspond to at least one of the picture application execution PicturesView state 25, the picture search function execution SearchView state 26, the search result display screen output SearchViewResult state 27, the search result display screen output, in which a picture is non-selected, SearchEmptySelectedView state 28, the search result display screen output, in which at least one picture is selected, SearchSelectedView state 29, or the share application selection screen output CrossShare state 30.

In an embodiment, parameter information of the path rule may correspond to at least one state. For example, the selected at least one picture may be included in the SearchSelectedView state 29.

The task (e.g., "please share a picture!") that the user requests may be performed depending on the execution result of the path rule including the sequence of the states 25, 26, 27, 28, and 29.

Figure 6:
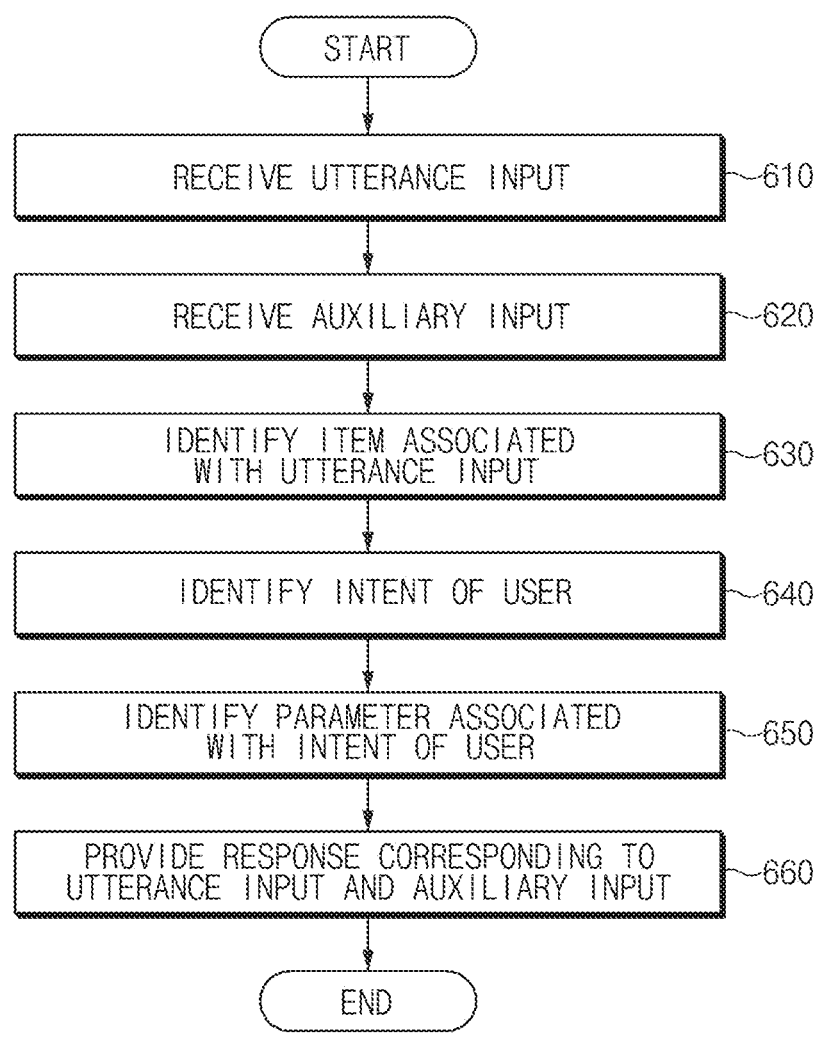
FIG. 6 is a flowchart illustrating an execution method of an intelligent application according to an embodiment of the disclosure.

FIG. 6 is a flowchart illustrating an execution method of an intelligent application according to an embodiment of the disclosure.

Referring to FIG. 6, in operation 610, a processor (e.g., the processor 150 of FIG. 2) of a user terminal (e.g., the user terminal 100 of FIG. 2) according to an embodiment of the disclosure may receive an input (hereinafter referred to as an "utterance input") through the voice of a user via the mounted microphone (e.g., the input module 110 of FIG. 2). The utterance input may be an input for executing an application in the user terminal 100 via the user's voice. In an embodiment of the disclosure, the utterance input may be an interactive message that the user uses on a daily basis. For example, the utterance input may be an interactive message, such as "send this photo to friend A" or "move this file".

According to various embodiments of the disclosure, in operation 620, the processor 150 of the user terminal 100 may receive an auxiliary input (e.g., a touch or gesture input) via an input interface. For example, the auxiliary input is an additional user input other than the utterance input; the auxiliary input may include a touch input using a user's body part, an input using a touch pen, a hovering input using a touch pen, an input using a wirelessly connected mouse, or an input using a wirelessly connected keyboard.

According to various embodiments of the disclosure, the processor 150 of the user terminal 100 may receive the auxiliary input via the user interface (UI) of an application (hereinafter referred to as a "foreground app") that is being displayed on a display (e.g., the display 120 of FIG. 2). For example, the UI of the foreground app may include an input interface (e.g., a cursor in a word app, a handwriting input interface in a memo app) for receiving a user input.

According to various embodiments of the disclosure, the processor 150 of the user terminal 100 may generate an input interface for receiving the auxiliary input. The input interface may be one of the user interfaces running in the foreground app. For example, the input interface may be a UI that allows the user to select at least part of the thumbnail images of photos stored in the gallery app.

According to various embodiments of the disclosure, the input interface may be an additional UI (e.g., a transparent layer) generated in the foreground app or on the foreground app. For example, when the user generates an input using a touch pen (not illustrated) on a transparent layer, the user terminal 100 may receive the touch pen input as an auxiliary input associated with the utterance input and/or the UI of the foreground app.

According to various embodiments of the disclosure, in operation 630, the processor 150 of the user terminal 100 may identify at least one item associated with the utterance input and/or the UI of the foreground app, based at least partly on the auxiliary input (e.g., touch or gesture input). For example, the item may include at least one of a text, a media file, information (e.g., a file name or a path) about the media file, link information, location information (or geographical information), point of interest (POI), an address, or file path information. According to an embodiment of the disclosure, the user terminal 100 may transmit an item identified through the utterance input and auxiliary input and/or other information associated with the item (hereinafter referred to as information on an item), to the intelligence server 200.

According to various embodiments of the disclosure, the auxiliary input may be used to identify an item (or the parameter for intelligent voice recognition) that is not specified by the user's utterance input or is not included. For example, in a state where at least one or more image files are displayed on the display 120, when an utterance input of "send this photo to friend A" occurs, a photo file corresponding to 'this photo' may not be specified in the utterance input. The user terminal 100 may identify information (e.g., a file name and a file storage path) about the photo file corresponding to 'this photo', via an auxiliary input. For another example, when the utterance input of "move this file to here" occurs, the user terminal 100 may identify the information (e.g., a file name and a file storage path) about the file corresponding to 'this file' via the auxiliary input. Moreover, the user terminal 100 may identify information on the file storage path corresponding to 'here' via the auxiliary input.

In an embodiment of the disclosure, in the case where the auxiliary input is a touch input using the part of the body, when a change in a specified physical quantity (e.g., voltage, light amount, resistance, charge amount, or capacitance) by the user's touch is detected, the processor 150 may receive an event including coordinate information from a touch pad. The processor 150 may identify the content (e.g., an image, a text, a link, or the like) indicated by a user touch, as an item.

In another embodiment of the disclosure, in the case where the auxiliary input is a touch pen input, the processor 150 may identify the item based on the location where the touch pen is hovered or a specified gesture (e.g., a line, a circle, a check mark, or the like) occurs.

In another embodiment of the disclosure, when the auxiliary input is the pointer input of a mouse (e.g., BT mouse), the processor 150 may receive an event value through an input device driver to process the event value. The processor 150 may identify an item based on the right/left click operation of the mouse and/or the location of the mouse pointer.

In another embodiment of the disclosure, when the auxiliary input is the input of a keyboard (e.g., BT keyboard), the processor 150 may receive the text entered in a text input field via the keyboard, as the auxiliary input. For example, when the user writes "the meeting time has changed. The meeting is tomorrow at 3:00 PM in meeting room A1" in the text input field and the user utters "send it to Jane by mail", the processor 150 may identify an item based on the text recorded in the text input field.

According to various embodiments of the disclosure, the information on an item may include information for transmitting the identified item to the intelligence server 200. For example, the information on an item may include information from converting the identified item in a different form.

For example, when the auxiliary input to select at least one contact through a contacts app is received, the identified item may be the contact name, and the information on the item may be the phone number stored in the contact.

For another example, when an auxiliary input to assign the location via a map app is received, the identified item may be location information (e.g., latitude and longitude) on a map, and the information on the item may include POI, an address, or the stored at least one other location (e.g., a current location), which is associated with the identified location information.

For another example, in the case where user handwriting is received via a memo app, the identified item may be the area handwritten by the user, and the information on the item may include a character from converting the user handwriting into a text. The processor 150 may transmit, to the intelligence server 200, the identified item and/or information on an item.

According to various embodiments of the disclosure, in operation 640, a processor (e.g., the NLU module 220) of the intelligence server 200 may identify the user's intent based at least partly on an utterance input. For example, the processor (e.g., the NLU module 220) of the intelligence server 200 may identify the user's intent based on the matching rule stored in the NLU DB 221.

According to various embodiments of the disclosure, in operation 650, the processor (e.g., the NLU module 220) of the intelligence server 200 may identify a parameter associated with the user's intent, using the item identified via the auxiliary input. For example, when an utterance input of "send this photo to friend A" occurs, the parameter may be 'image files' selected through a touch pen input. For another example, when an utterance input of "move this file to here" occurs, the parameter may be 'files' selected through the first touch input and the name and storage location (or storage path) of the 'folder' selected through the second touch input.

According to an embodiment of the disclosure, the processor (e.g., the path planner module 230) of the intelligence server 200 may generate a path rule based on the identified intent of the user and the identified parameter. For example, the path rule may include information on the process of executing a message app, opening a dialog window with friend A, and transmitting an image file selected via the auxiliary input.

According to various embodiments of the disclosure, in operation 660, the processor 150 of the user terminal 100 may provide a response corresponding to an utterance input and an auxiliary input, based at least on at least one parameter and the user's intent, which are identified by the intelligence server 200. According to an embodiment of the disclosure, the processor 150 of the user terminal 100 may receive a path rule from the intelligence server 200 and may execute one or more applications based on the received path rule. The processor 150 of the user terminal 100 may output the execution result via a display. For example, the processor 150 of the user terminal 100 may launch a message app based on the information defined in the path rule and may transmit, to friend A, the image file selected via the auxiliary input. The processor 150 of the user terminal 100 may display the result of transmitting a message, on a display (the display 120 of FIG. 2).

Figure 7:
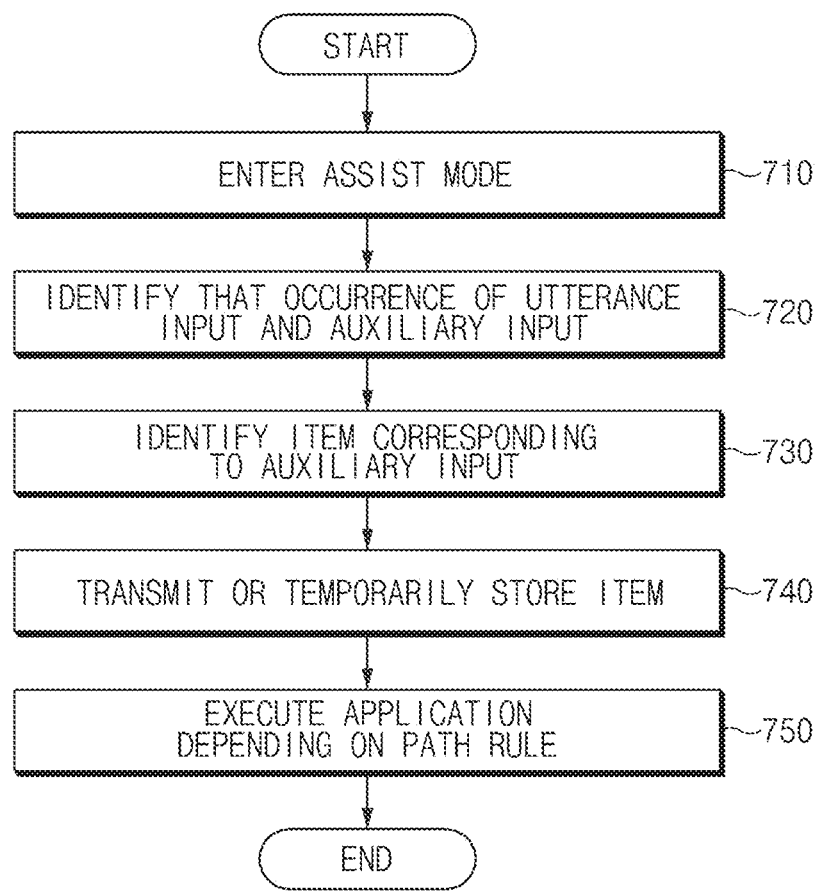
FIG. 7 is a flowchart indicating a process in which a user terminal executes an application based on an utterance input and an auxiliary input according to an embodiment of the disclosure.

FIG. 7 is a flowchart indicating a process in which a user terminal executes an application based on an utterance input and an auxiliary input according to an embodiment of the disclosure.

Referring to FIG. 7, according to various embodiments of the disclosure, in operation 710, a processor (e.g., the processor 150 of FIG. 2) of a user terminal (e.g., the user terminal 100 of FIG. 1) may enter a mode (hereinafter referred to as an "assist mode") capable of receiving both the utterance input and the auxiliary input. The assist mode may refer to a mode of receiving both the utterance input and the auxiliary input. According to an embodiment of the disclosure, when entering the assist mode, the processor 150 may display an input interface for receiving the auxiliary input. For example, the processor 150 may switch a UI of a foreground app before conversion to the assist mode, to a separate UI (a UI capable of selecting at least one or more items). For another example, the processor 150 may generate an input interface in the form of a transparent layer output to overlap with the execution window of a foreground app.

According to various embodiments of the disclosure, the processor 150 may enter an assist mode based on a triggering condition. The triggering condition may refer to a condition in which a specified input (hereinafter referred to as a "triggering input") for executing an intelligent app is received. For example, the triggering input may be an input to press a specified button (e.g., a touch button or a physical button) on a UI of the foreground app to enter the assist mode. The specified button may be a button assigned to execute the intelligent app. For another example, the triggering input may be an utterance input for executing the intelligent app. When the triggering input is received, the intelligent app may be executed in the background or may be executed to cover a partial area of the foreground app (e.g., pop-up).

According to various embodiments of the disclosure, when the triggering condition is satisfied in a state where the intelligent app is running, the processor 150 may enter the assist mode. For example, the intelligent app may be in a state where the intelligent app is being executed as a background app. When receiving a specified input (e.g., a touch button, a physical button input, or an utterance input) for entering the assist mode, the processor 150 may enter the assist mode in a state where the intelligent app that is a foreground app or a background app is running.

According to various embodiments of the disclosure, in operation 720, the processor 150 may identify whether an utterance input and an auxiliary input occur. The processor 150 may receive the utterance input using a microphone and may receive an auxiliary input via an input interface.

According to an embodiment of the disclosure, at least part of each of the utterance input 310 and the auxiliary input 320 may occur at the same time. For example, while receiving the utterance input of a user, the processor 150 may receive at least part of a touch input.

According to another embodiment of the disclosure, the utterance input 310 and the auxiliary input 320 may occur with the time difference within a specified time range. For example, the touch input using the touch pen may first occur and terminated, and an utterance input may occur within a specified time range (or interval) (e.g., within 3 seconds). For another example, the user's utterance input may first occur and terminated, and then the touch input may occur within the specified time range.

According to various embodiments of the disclosure, the auxiliary input may be a plurality of inputs that occur within a specified time range or at a specified timing. For example, the auxiliary input may be an input to select a plurality of points on a map or may be an input to select a plurality of image files.

According to various embodiments of the disclosure, in operation 730, the processor 150 may identify an item (or a parameter for intelligent voice recognition) corresponding to the auxiliary input.

According to various embodiments of the disclosure, when receiving an input using the touch pen in an assist mode, the processor 150 may process the touch pen input as an input to select an item included in (or associated with) the UI of the foreground app, instead of applying the touch pen input to the foreground app that was previously running. For example, when a specific portion on the display 120 is selected via the touch pen, the processor 150 may identify the item corresponding to the area selected by the auxiliary input, on the UI of the foreground app.

According to various embodiments of the disclosure, the processor 150 may identify the item through image processing of the image from capturing the execution window of the foreground app. For example, the processor 150 may recognize the character by an optical character recognition method and may identify the position of interest (POI) of a user, in the map image from capturing the user interface. For another example, the processor 150 may recognize object information (e.g., the face of a person) included in the captured image.

According to various embodiments of the disclosure, in operation 740, the processor 150 may transmit the identified item and/or information on the identified item to the intelligence server 200 or may temporarily store the identified item and/or information on the identified item in a memory (e.g., the memory 140 of FIG. 2). For example, when the identified item is location information (e.g., latitude/longitude) on the map, the information on the item may be address information corresponding to the location information.

For example, the processor 150 may transmit, to the intelligence server 200, the item identified based on the auxiliary input and the information on the item, along with the utterance input. For another example, the processor 150 may transmit an utterance input to the intelligence server 200, and the item identified based on the auxiliary input and the information on the item may be stored in the memory (e.g., the memory 140 of FIG. 2).

According to various embodiments of the disclosure, the processor 150 may transmit state information (or execution information) of the foreground app to the intelligence server 200 together with the utterance input.

According to various embodiments of the disclosure, in operation 750, the processor 150 may execute one or more applications depending on the path rule transmitted from the intelligence server 200. For example, when transmitting the item, which is identified based on the auxiliary input, to the intelligence server 200, the processor 150 may execute the application depending on the path rule generated based on the item identified based on the utterance input and auxiliary input. For another example, when temporarily storing the identified item identified based on the auxiliary input in the internal memory of the user terminal 100, the processor 150 may execute the path rule by inputting the identified item in the empty parameter in the path rule generated based on the utterance input.

Figure 8:
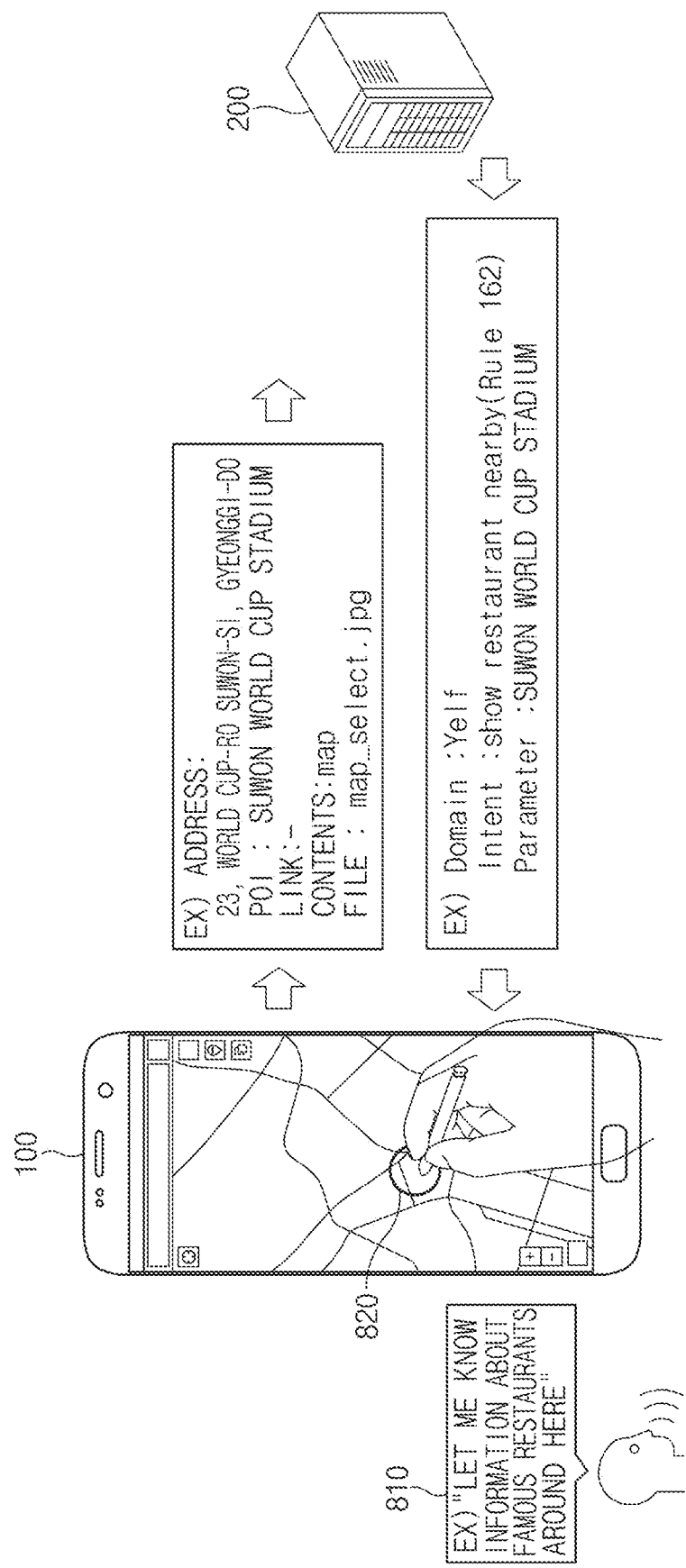
FIG. 8 is an execution exemplification view indicating an operation in an assist mode at a user terminal according to an embodiment of the disclosure.

FIG. 8 is an execution exemplification view indicating an operation in an assist mode at a user terminal according to an embodiment of the disclosure. An embodiment is exemplified in FIG. 8 as one app (e.g., map app) is executed on a full screen in a mobile device. However, embodiments are not limited thereto.

Referring to FIG. 8, a processor (e.g., the processor 150 of FIG. 2) of a user terminal (e.g., the user terminal 100 of FIG. 1) may execute various types of applications. For example, the processor 150 may execute various types of applications, such as a map app, a message app, an e-mail app, or the like. The processor 150 may display a UI of a running application on a display (e.g., the display 120 of FIG. 2).

According to various embodiments of the disclosure, when a user input occurs in the UI of a running foreground app (e.g., map app), the processor 150 may perform the corresponding function. For example, the processor 150 may display a map image and the related buttons for manipulation, in the map app. In response to the user's touch input, the map may be moved/enlarged/reduced or location information may be displayed.

According to various embodiments of the disclosure, when entering an assist mode, the processor 150 may receive an auxiliary input.

According to various embodiments of the disclosure, the processor 150 may receive an utterance input 810 via a microphone (e.g., the input module 110 of FIG. 2) mounted on the user terminal 100. The processor 150 may receive an input interface auxiliary input 820. For example, the auxiliary input 820 may be a touch input or a gesture input that a user generates on a display (e.g., the display 120 of FIG. 2) using a touch pen.

According to various embodiments of the disclosure, when the user generates the auxiliary input 820 using the touch pen, the processor 150 may identify the item (e.g., location information) based on the auxiliary input 820.

According to various embodiments of the disclosure, the processor 150 may operate an intelligent app and/or a foreground app in response to the utterance input 810 and the auxiliary input 820 of a user. For example, the utterance input 810 may be "let me know the information on famous restaurants around here". The auxiliary input 820 may be a circular gesture input, using a touch pen.

According to various embodiments of the disclosure, the processor 150 may identify an item corresponding to an item, which is not specified in the utterance input 810, or the specified term (e.g., "here", "this", "it", or the like) based on the auxiliary input 320.

According to various embodiments of the disclosure, the processor 150 may analyze the input interface auxiliary input 820. For example, the processor 150 may identify the type of a touch pen input, using the point information, location information, or stroke information of the auxiliary input 820, which is displayed on the transparent layer.

According to various embodiments of the disclosure, the processor 150 may identify an item (e.g., latitude/longitude information at a point touched on the map) that corresponds to an area corresponding to the auxiliary input 820.

According to various embodiments of the disclosure, the processor 150 may identify the item in the captured image corresponding to the area corresponding to the auxiliary input 820. For example, the processor 150 may identify the user's POI by recognizing the text of "Suwon World Cup Stadium" by optical character recognition method, in the map image of the specified range with the center at the point where the auxiliary input 820 occurs.

According to various embodiments of the disclosure, the processor 150 may store the identified item or information (or information from modifying the item) about the item in a memory (e.g., the memory 140 of FIG. 2) or may transmit the identified item or the information on the item to the intelligence server 200. For example, the processor 150 may transmit, to the intelligence server 200, POI information (e.g., Suwon World Cup Stadium), latitude/longitude information, address information (e.g., 23, World cup-ro Suwon-si, Gyeonggi-do), map image information (e.g., map_select.jpg) or the like, which corresponds to the auxiliary input 820 on a map, together with the utterance input 810.

According to an embodiment of the disclosure, the intelligence server 200 may receive the item identified via the utterance input 810 and the auxiliary input 820 or information on an item. The intelligence server (e.g., ASR module) 200 may convert the utterance input 810 into a text. The intelligence server (e.g., NLU module) 200 may identify a domain, an intent, and a parameter, based on an utterance input in a text form.

According to various embodiments of the disclosure, when the intelligence server (e.g., NLU module) 200 does not specify the parameter necessary to generate the path rule in the utterance input 810, the intelligence server 200 may identify an alternative parameter, using the item received together with the utterance input 810.

For example, when the utterance input 810 is "let me know the information on famous restaurants around here", the intelligence server (e.g., NLU module) 200 may identify that "around here" is specified as a parameter and needs to be replaced by information (e.g., POI) associated with the location. The intelligence server (e.g., NLU module) 200 may identify information (e.g., "Suwon World Cup Stadium") associated with a location among the received at least one or more items as a parameter that replaces "around here". The intelligence server (e.g., NLU module) 200 may identify the domain as a "famous restaurant information application", may identify the intent as "performing a function to show a restaurant near a specific POI", and may identify the parameter as "Suwon World Cup Stadium". The intelligence server (e.g., path rule generation module) 200 may generate the path rule based on the identified domain, intent, and parameter. The intelligence server 200 may transmit the generated path rule to the user terminal 100.

According to various embodiments of the disclosure, the processor 150 of the user terminal 100 may execute one or more apps based on the path rule transmitted from the intelligence server 200. For example, the processor 150 may execute the famous restaurant information application defined in the path rule and may display information on famous restaurants around Suwon World Cup Stadium.

Figure 9:
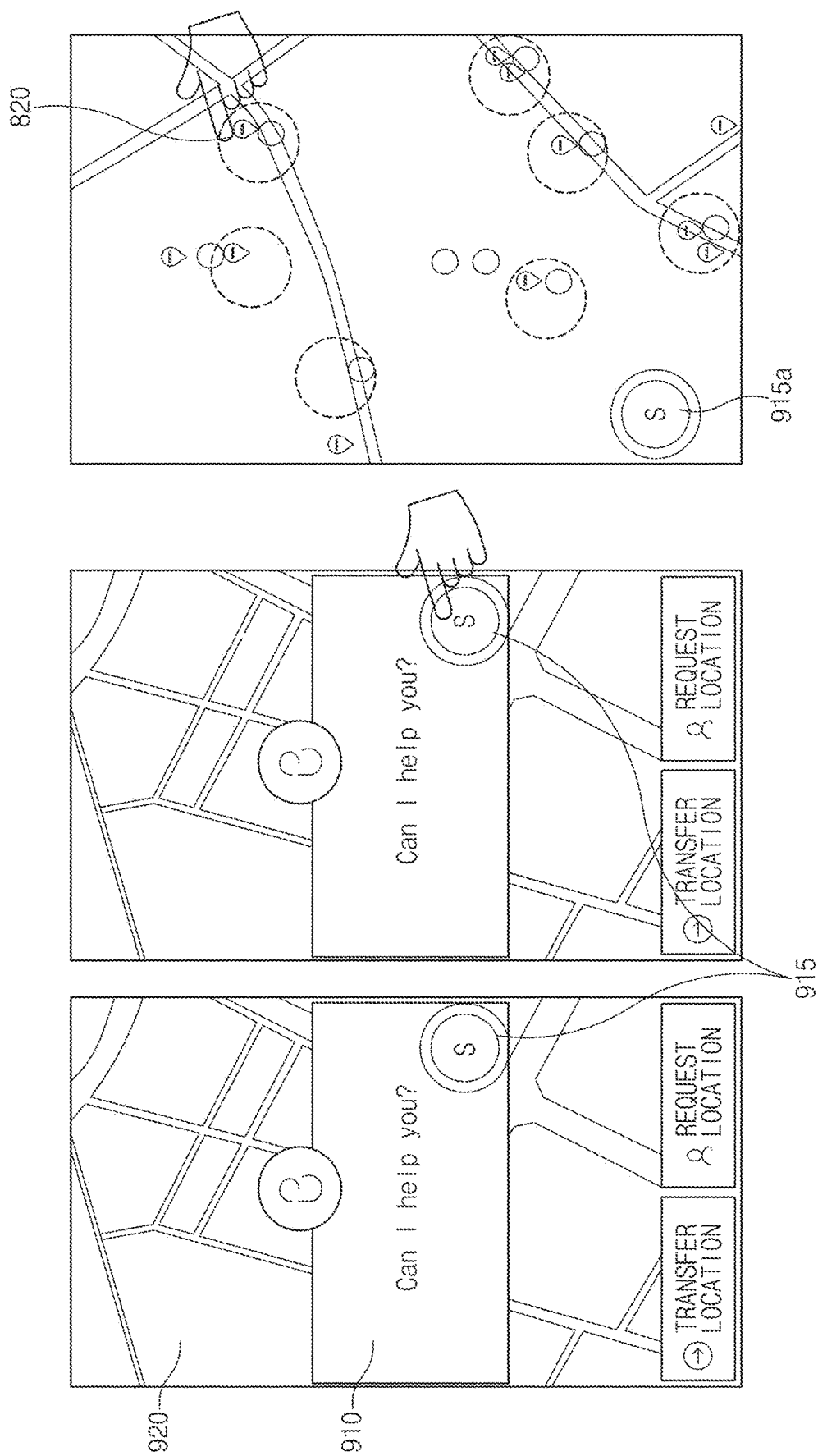
FIG. 9 is a screen view illustrating entrance of an assist mode by a user input according to an embodiment of the disclosure.

FIG. 9 is a screen view illustrating entrance of an assist mode by a user input according to an embodiment of the disclosure.

Referring to FIG. 9, the processor 150 (e.g., the processor 150 of FIG. 2) of a user terminal (e.g., the user terminal 100 of FIG. 1) may execute an intelligent app (or an intelligence app, an interaction app, an interactive command app, or the like). The intelligent app may grasp a user's utterance intent based on the utterance input or auxiliary input of a user to execute one or more applications in a manner matched to the utterance intent.

According to an embodiment of the disclosure, a UI 910 of the intelligent app may be displayed in a form (e.g., pop-up) that covers the part of an execution window 920 of the foreground app (e.g., map app). When the intelligent app is executed, the microphone (e.g., the input module 110 of FIG. 2) of the user terminal 100 may be activated.

According to an embodiment of the disclosure, when a specified user voice input (e.g., wake up!) occurs, the processor 150 may execute the intelligent app. According to another embodiment of the disclosure, the processor 150 may perform an intelligent app when a dedicated button for executing an intelligent app is manipulated.

According to various embodiments of the disclosure, the processor 150 may operate an intelligent app and a foreground app in an assist mode capable receiving both the utterance input and the auxiliary input.

According to an embodiment of the disclosure, when a triggering input for entering the assist mode occurs, the processor 150 may enter the assist mode. For example, the triggering input may be an input to push a predetermined entry button 915 in the UI 910 of the intelligent app to enter the assist mode.

According to various embodiments of the disclosure, when the user presses the entry button 915, the processor 150 may allow the intelligent app and the foreground app to enter the assist mode. The processor 150 may display an interface 915a indicating that the intelligent app and the foreground app enter the assist mode.

According to various embodiments of the disclosure, when the user generates an auxiliary input 820 (e.g., a touch input using a part of the body), the processor 150 may process the auxiliary input 820 as an input to select an item without applying the auxiliary input 820 to the foreground app that was previously running.

The triggering input using the entry button 915 is illustrated in FIG. 9. However, embodiments are not limited thereto.

For example, when the user touches an area other than the UI 910 of the intelligent app, the processor 150 may enter the assist mode. For another example, when a swipe input is started at the UI 910 of the intelligent app and extends to an area outside the UI 910, the processor 150 may enter the assist mode. For another example, when the intelligent app is executed to start a specified touch input at the UI 910, and then the processor 150 receives a triggering input in a specified voice form, the processor 150 may enter the assist mode. For example, when the user generates a voice input, such as "assist mode", "multi modal input", "maintain context", or the like, the processor 150 may enter the assist mode. Alternatively, in a state where the intelligent app is not executed, when receiving a triggering input in a specified voice form, the processor 150 may enter the assist mode at once.

According to various embodiments of the disclosure, the processor 150 may enter the assist mode without a separate triggering input. When the user's utterance input includes a specified term, the processor 150 may automatically enter the assist mode. For example, when the user generates an utterance input of "Let me know the bus route to Jam-sil", the processor 150 may analyze the primary utterance input (analysis through the intelligence server 200) to identify that there is no information on the starting point being the essential parameter, and may enter the assist mode. The processor 150 may output a UI displayed to select a bus stop (starting point), in the map app. When the user selects one or more points in the input interface (a location selection input interface), the processor 150 may provide information on a bus route to the Jam-sil, based on the selected starting point.

According to various embodiments of the disclosure, the processor 150 may automatically enter the assist mode, in response to various signals associated with an application or a peripheral device. For example, when a specific app (e.g., a map app) is executed, the processor 150 may automatically enter the assist mode. For another example, when the touch pen is detached from the user terminal 100, the processor 150 may automatically enter the assist mode.

According to various embodiments of the disclosure, when an auxiliary input other than the utterance input does not occur during the specified time, the processor 150 may terminate the assist mode and may operate in a mode (hereinafter referred to as a "normal mode") that operates only with the utterance input.

Figure 10:
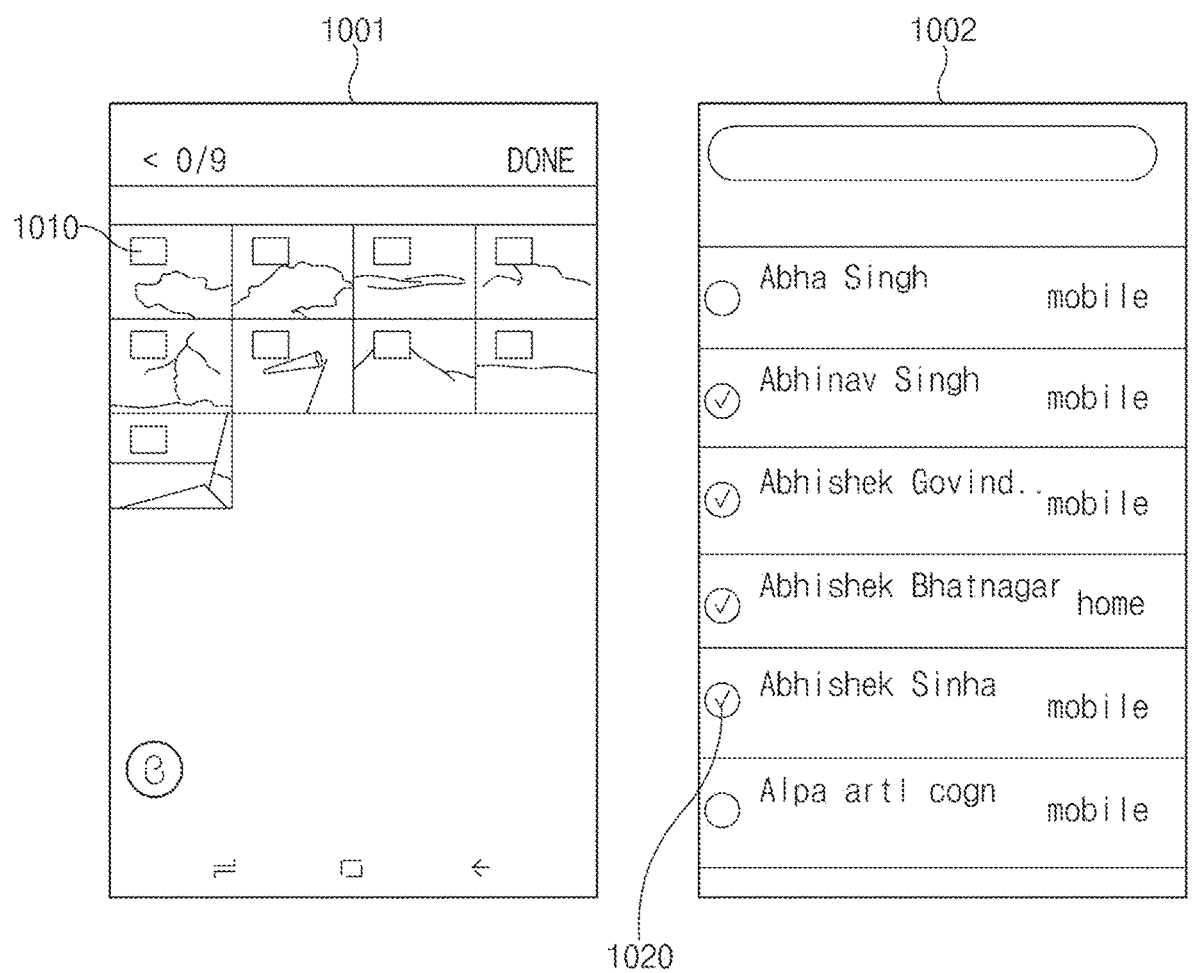
FIG. 10 is a screen view that is switched to a user interface (UI) in which an item is selectable according to an embodiment of the disclosure.

FIG. 10 is a screen view that is switched to a UI in which an item is selectable according to an embodiment of the disclosure.

Referring to FIG. 10, when the mode of an application is switched to an assist mode, a processor (e.g., the processor 150 of FIG. 2) may display a UI capable of selecting a plurality of items, in a foreground app.

According to various embodiments of the disclosure, the processor 150 may enter the assist mode automatically or in response to a triggering input. The processor 150 may display a user interface, which is capable of selecting an item and which includes a list and check box.

For example, when the processor 150 enters the assist mode in a gallery app user interface 1001, the processor 150 may display an image list including a check box 1010 capable of selecting each image, in an execution window illustrating an image list in the thumbnail form. When at least part of the check box 1010 is selected by a user input and when an utterance input of "send this photo to mom via a message" occurs, the processor 150 may identify file information (e.g., a file name, a file size, a storage location, or the like) about the selected image as an item.

For another example, when entering the assist mode in a UI 1002 of the address book app, the processor 150 may display a contact list including a check box 1020 capable of selecting each contact, in an execution window illustrating a stored contact list. When at least a portion of the check box 1020 is selected by a user input and when the utterance input of "open a chat room including these people" occurs, the processor 150 may generate a chat room including the selected contacts.

Figure 11:
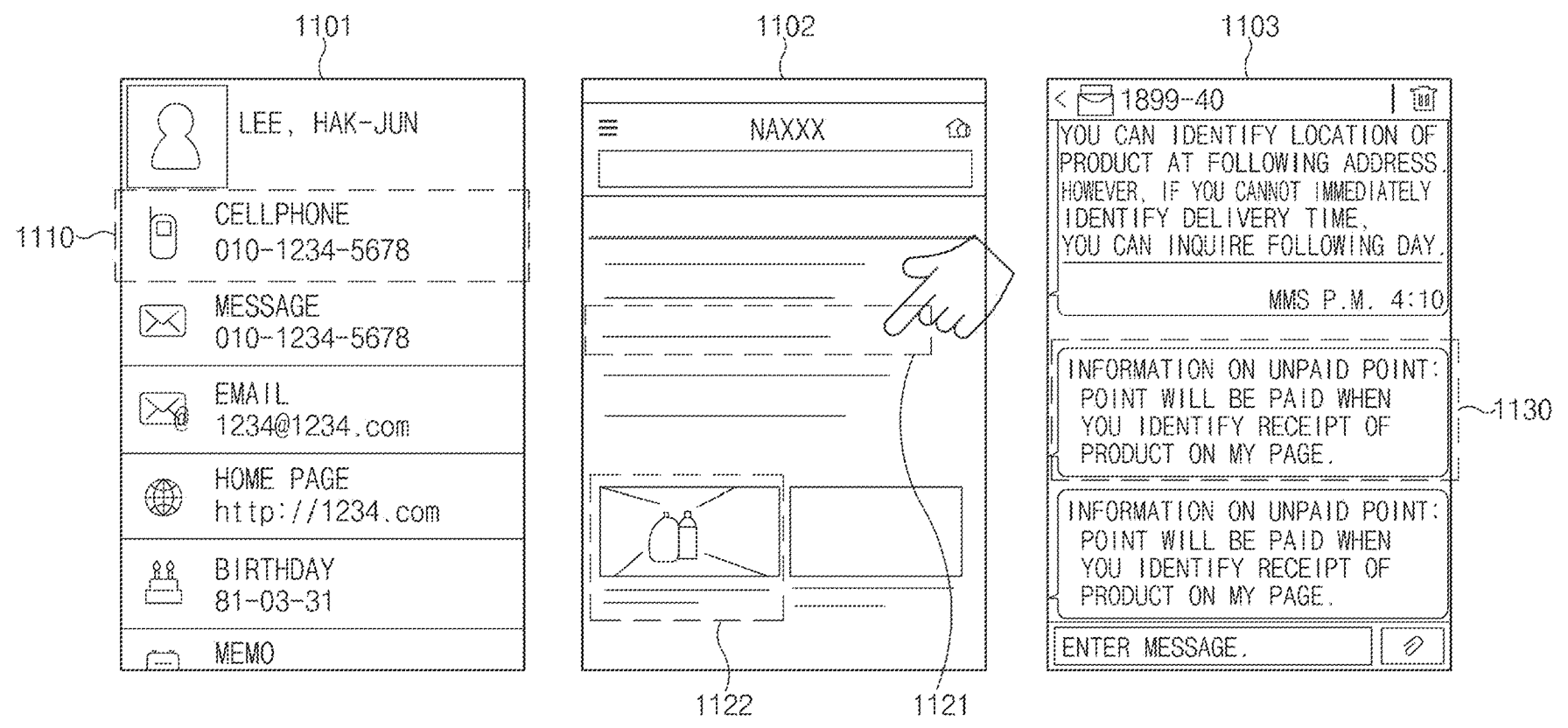

FIG. 11 is a screen view in which an item is identified using a layout of a UI being displayed on a display according to an embodiment of the disclosure.

Referring to FIG. 11, when entering an assist mode, a processor (e.g., the processor 150 of FIG. 2) may identify an item corresponding to an auxiliary input, using the layout of a UI of a foreground app.

According to various embodiments of the disclosure, when receiving the auxiliary input, the processor 150 may identify an item, in an area (an area identified by the layout or a section distinguished by the layout) of a UI of a foreground app corresponding to a point where the auxiliary input occurs.

According to various embodiments of the disclosure, the processor 150 may process the auxiliary input, which occurs in the input interface, in the manner different from the manner processed in the foreground app.

For example, in the case of the normal mode, the processor 150 may map a short touch input to an operation, such as entering a text, making a call, or the like, in an address book UI 1101. The processor 150 may map a long touch input to an operation of displaying a pop-up including a list of copying a text, selecting a representative contact, or the like. In the case of the assist mode, the processor 150 may map the short touch input or the long touch input to an operation of copying the text (e.g., a telephone number, an e-mail address, or the like) included in a layout 1110 of an address book. According to various embodiments of the disclosure, when a user's utterance input (e.g., "copy it to put it in a memo pad") occurs, the processor 150 may identify a text (e.g., a telephone number, an e-mail address, or the like) at a location corresponding to the short touch input or the long touch input, as an item.

For another example, in the case of the normal mode, the processor 150 may map the short touch input 1121 to an operation of moving to a link screen 1122, in a web page 1102. The processor 150 may map a long touch input to an operation of displaying a pop-up including a list of copying a text, opening a new tab, selecting all things, or the like. In the case of the assist mode, the processor 150 may map a short touch input or a long touch input to an operation of copying content (e.g., a text, an image, a link, or the like) included in the UI of a web page. According to various embodiments of the disclosure, when a user's utterance input (e.g., "send this link to Suzy") occurs, the processor 150 may identify the content (e.g., a text, an image, a link, or the like) at a location corresponding to the short touch input or the long touch input, as an item.

For another example, in the case of the normal mode, the processor 150 may map the short touch input to an operation of displaying message content 1130, in a message app screen 1103. The processor 150 may map a long touch input to an operation of displaying a pop-up including a list of copying a text, selecting all things, deleting all things, sharing the attached file, or the like. In the case of the assist mode, the processor 150 may map a short touch input or a long touch input to an operation of copying content (e.g., a phone number, a text, an image, a link, an attached file, or the like) included in the UI of the message app screen 1103. According to various embodiments of the disclosure, when a user's utterance input (e.g., "copy this message and send it to Suzy") occurs, the processor 150 may identify the content (e.g., a phone number, a text, an image, a link, an attached file, or the like) at a location corresponding to the short touch input or the long touch input, as an item.

Figures 12A, 12B, 12C:
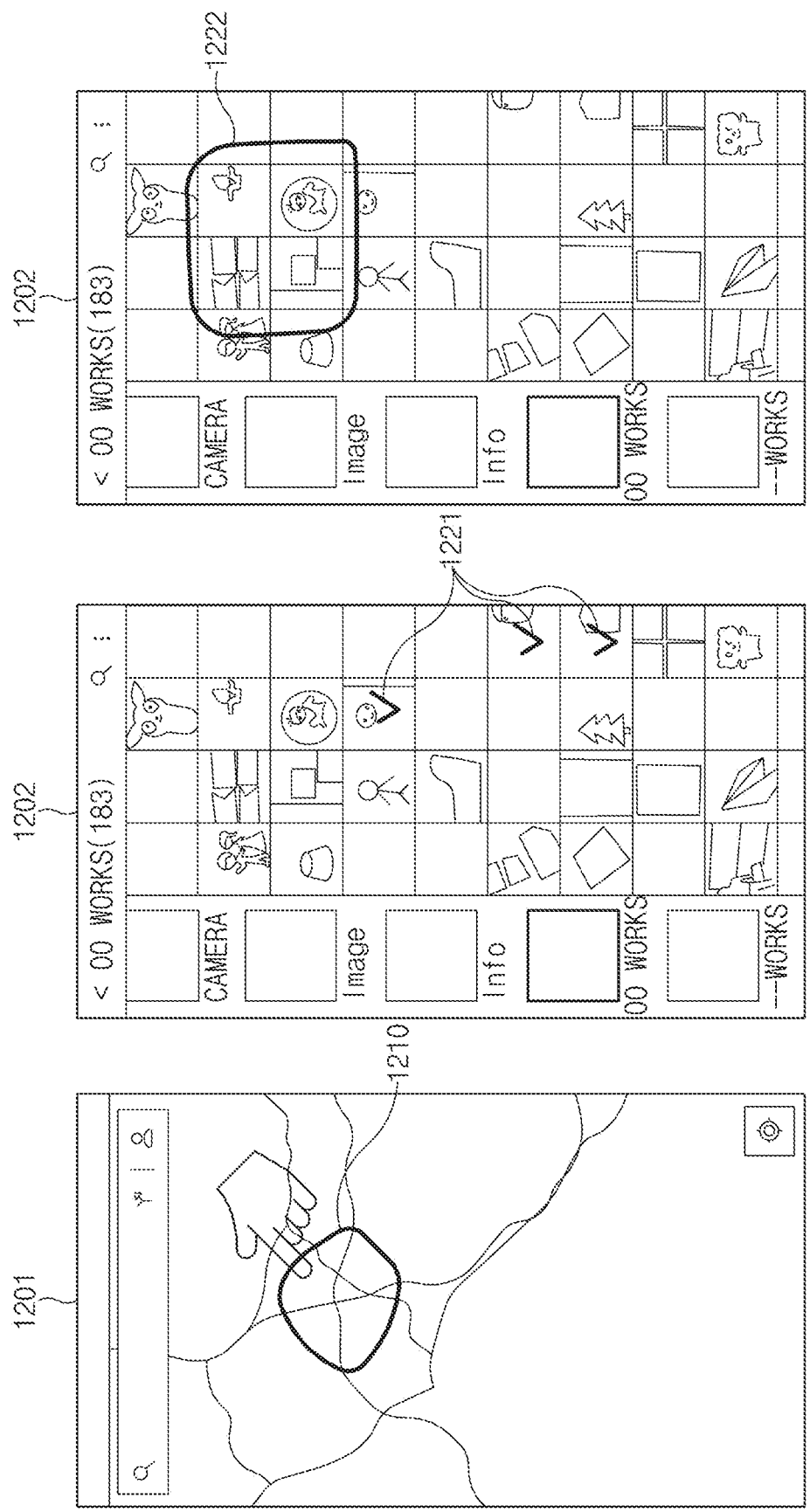
FIGS. 12A, 12B, and 12C illustrate screens in which an item that does not correspond to a layout of a UI being displayed is identified according to an embodiment of the disclosure.

FIGS. 12A to 12C illustrate screens in which an item that does not correspond to a layout of a UI being displayed is identified according to an embodiment of the disclosure.

Referring to FIGS. 12A to 12C, when entering an assist mode, a processor (e.g., the processor 150 of FIG. 2) may identify an item corresponding to an auxiliary input, regardless of the layout of a UI of a foreground app. The processor 150 allows a user to freely select an area that is not distinguished as the layout of a foreground app.

In FIG. 12A, in the normal mode, the processor 150 may set a selection input 1210 of the circular area in a map app 1201 to be disabled. In the case of an assist mode, the processor 150 may be configured to enable the selection input 1210 of the circular area.

According to various embodiments of the disclosure, when a user's utterance input (e.g., "Let me know how to go home from here") occurs, the processor 150 may identify the location information (e.g., latitude/longitude, POI, or the like) of the map corresponding to the selected circular area of the selection input 1210 as an item. Alternatively, the processor 150 may identify POI by recognizing a text in the map image by the optical character recognition method.

In FIGS. 12B and 12C, in the normal mode, the processor 150 may be configured to disable a check mark gesture 1221 or a selection input 1222 of the circular area in the gallery app 1202. In the case of the assist mode, the processor 150 may be configured to enable the check mark gesture 1221 or the selection input 1222 of the circular area.

According to various embodiments of the disclosure, when the user's utterance input (e.g., "Send this photo to Mom") occurs, the processor 150 may identify image files corresponding to the check mark gesture 1221 or the selection input 1222 of the circular area, as an item.

Figure 13A:
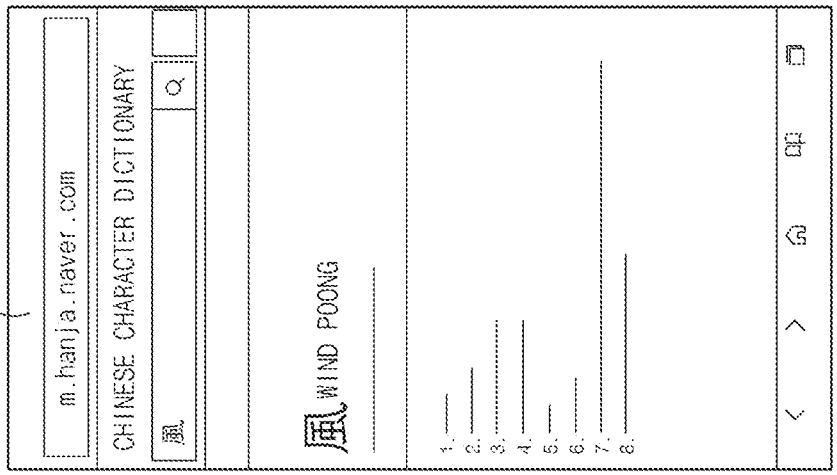
FIG. 13A is a view of an auxiliary input using a touch pen according to an embodiment of the disclosure.
Figure 13A:
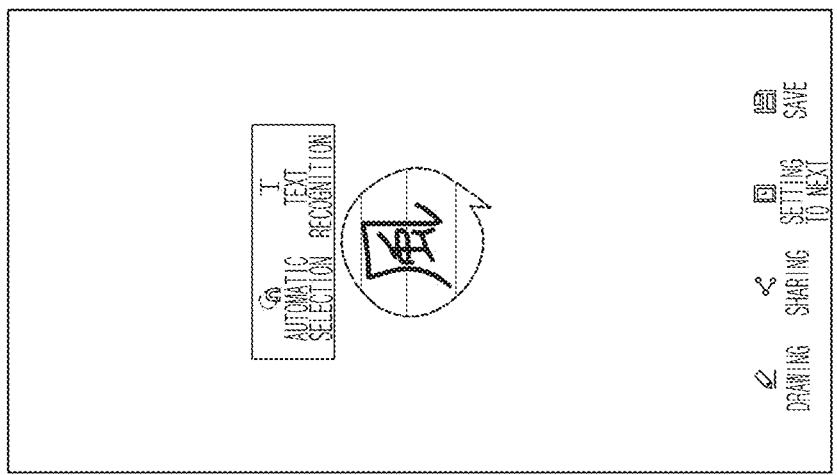
Figure 13A:
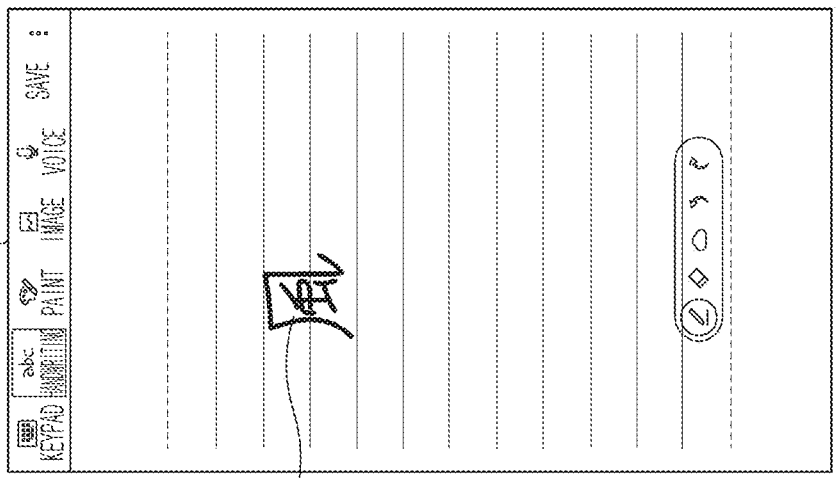
Figure 13B:
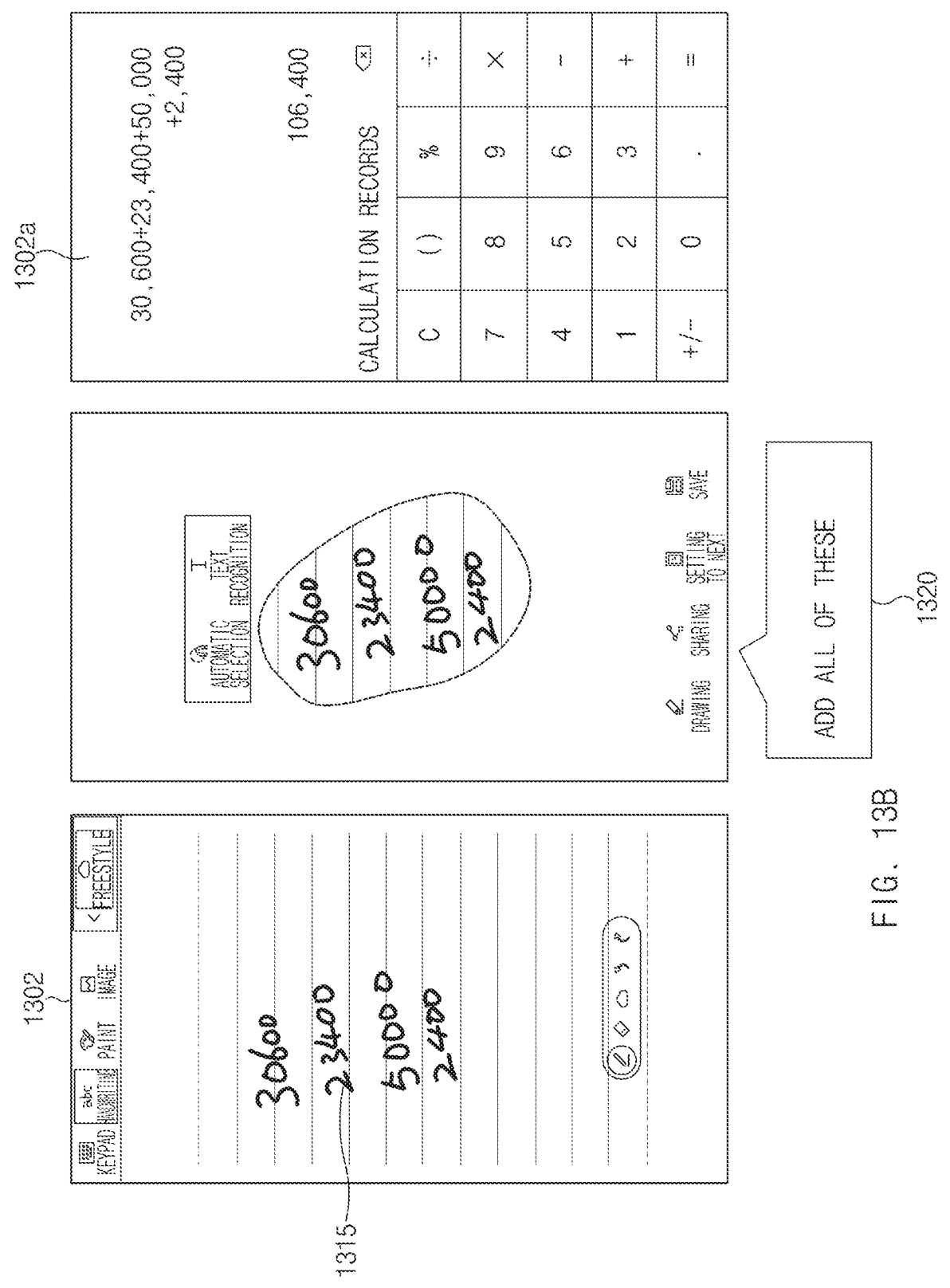
Figure 13C:
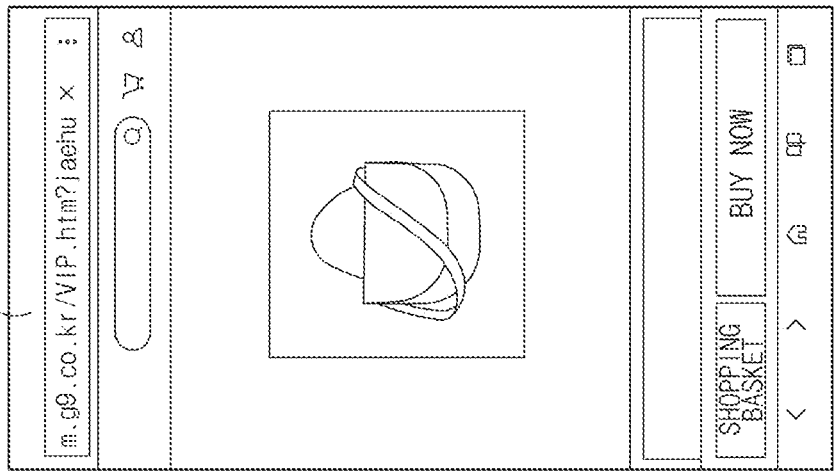
FIG. 13C is view of an auxiliary input using a touch pen according to an embodiment of the disclosure.
Figure 13C:
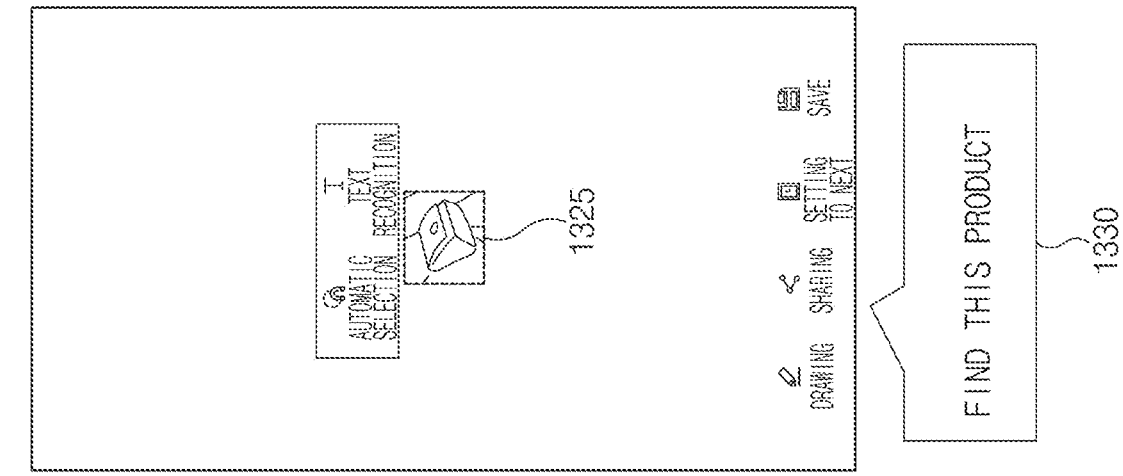
Figure 13C:
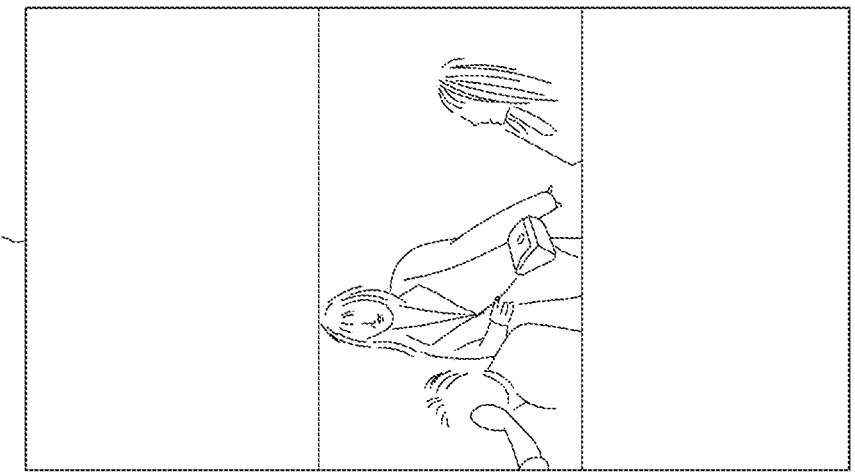

FIGS. 13A to 13C illustrate views of an auxiliary input using a touch pen according to various embodiments of the disclosure.

Referring to FIG. 13A, a processor (e.g., the processor 150 of FIG. 2) according to various embodiments may operate a running application in an assist mode. The processor 150 may receive the auxiliary input, using the touch pen.

For example, when a memo app 1301 enters the assist mode, the processor 150 may receive a handwriting input 1305 using a touch pen as an auxiliary input. In an embodiment of the disclosure, the processor 150 may receive the handwriting input 1305 and an utterance input (e.g., "What does this mean") 1310 at the same time or within a specified time range. The processor 150 may identify whether the handwriting input 1305 is handwriting. The processor 150 may identify the text corresponding to the handwriting as an item. The processor 150 may execute a dictionary app 1301a based on the path rule provided by the intelligence server 200 and may display the meaning of the Chinese character recorded by the user with the handwriting input 1305.

Referring to FIG. 13B, when a memo app 1302 according to various embodiments enters the assist mode, the processor 150 may receive a handwriting input 1315 using the touch pen as an auxiliary input. In an embodiment of the disclosure, the processor 150 may receive the handwriting input 1315 and an utterance input (e.g., "Add all of these") 1320 at the same time or within a specified time range. The processor 150 may identify whether the handwriting input 1315 is handwriting. The processor 150 may identify the number corresponding to the handwriting as an item. The processor 150 may execute a calculator app 1302a based on the path rule provided by the intelligence server 200 and may display the sum of the numbers recorded by the user with the handwriting input 1315.

Referring to FIG. 13C, when a video app 1303 according to various embodiments enters the assist mode, the processor 150 may receive a gesture input 1325 using a touch pen as an auxiliary input. The gesture input 1325 may be an input for capturing a screen of a video and selecting a product image to be found using the touch pen. In an embodiment of the disclosure, the processor 150 may receive the gesture input 1325 and an utterance input (e.g., "find this product") 1330 at the same time or within a specified time range. The processor 150 recognizes the product based on an object recognition algorithm and may identify a product name or a product code as an item. The processor 150 may execute a shopping app 1303a based on the path rule provided by the intelligence server 200 and may search for an object selected by the user through the gesture input 1325 to display the found object.

Figure 14A:
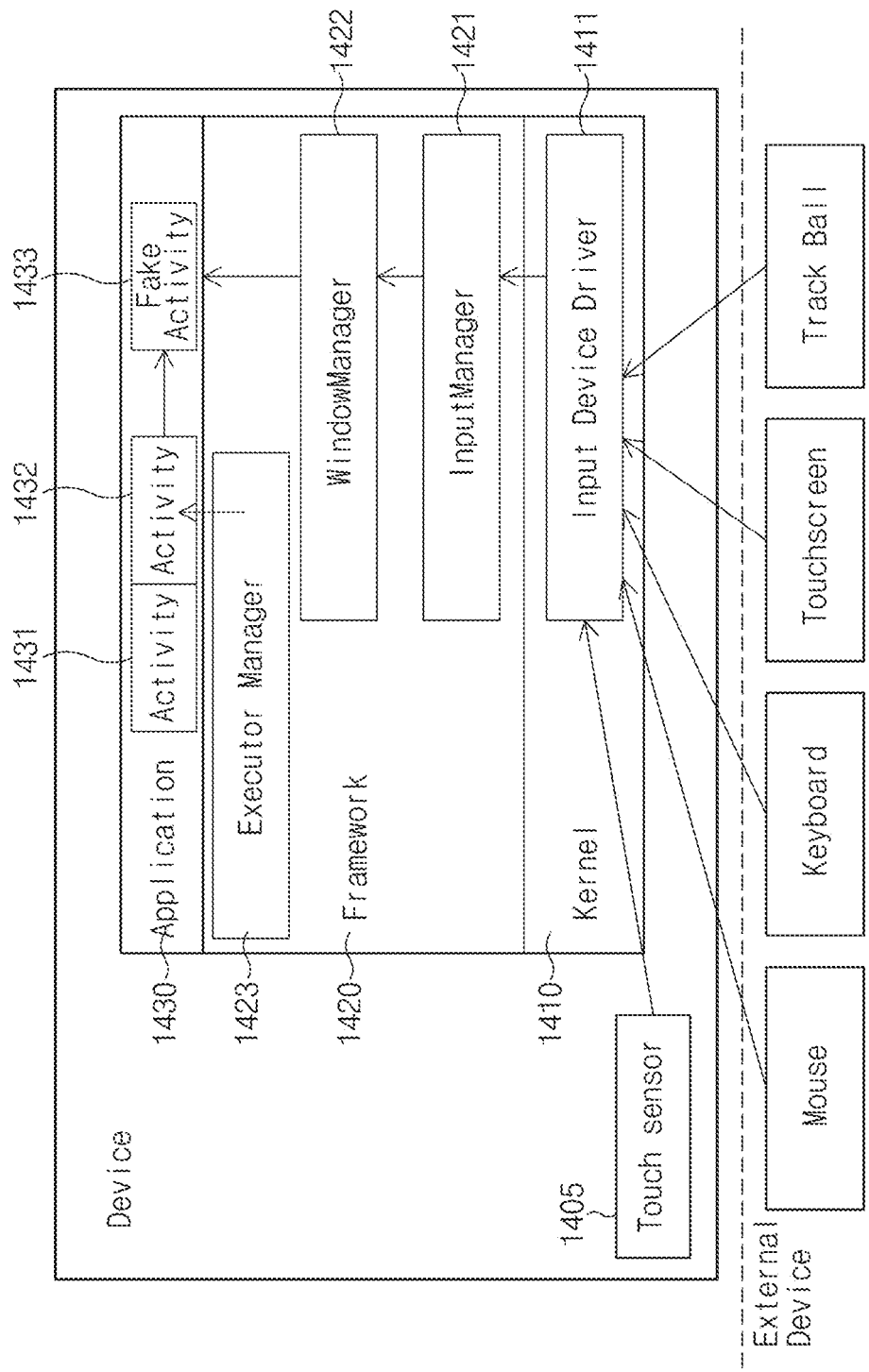
FIG. 14A is a configuration diagram of a program module of a user terminal operating in an assist mode according to an embodiment of the disclosure.
Figure 14B:
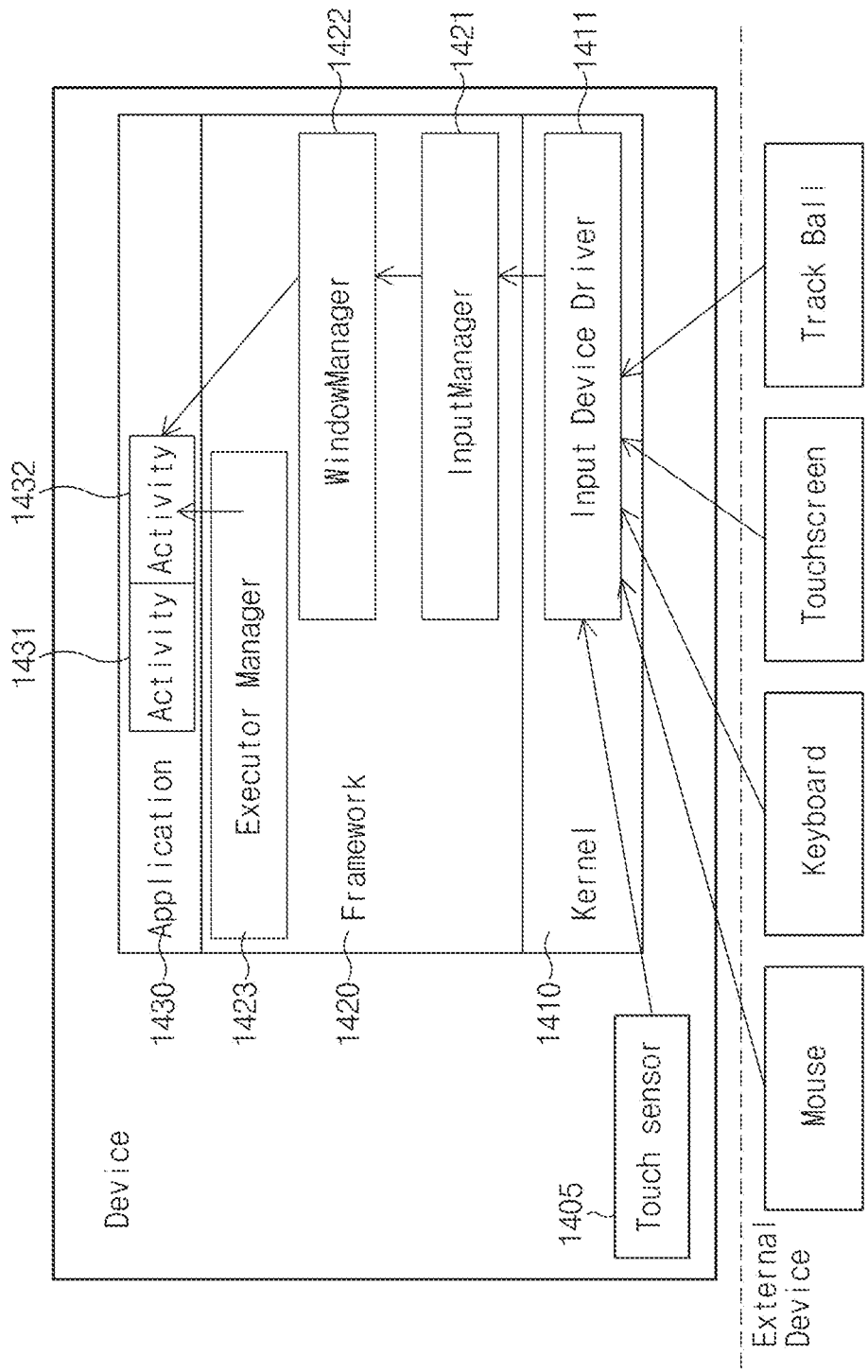
FIG. 14B is a configuration diagram of a program module of a user terminal operating in an assist mode according to an embodiment of the disclosure.
Figure 14C:
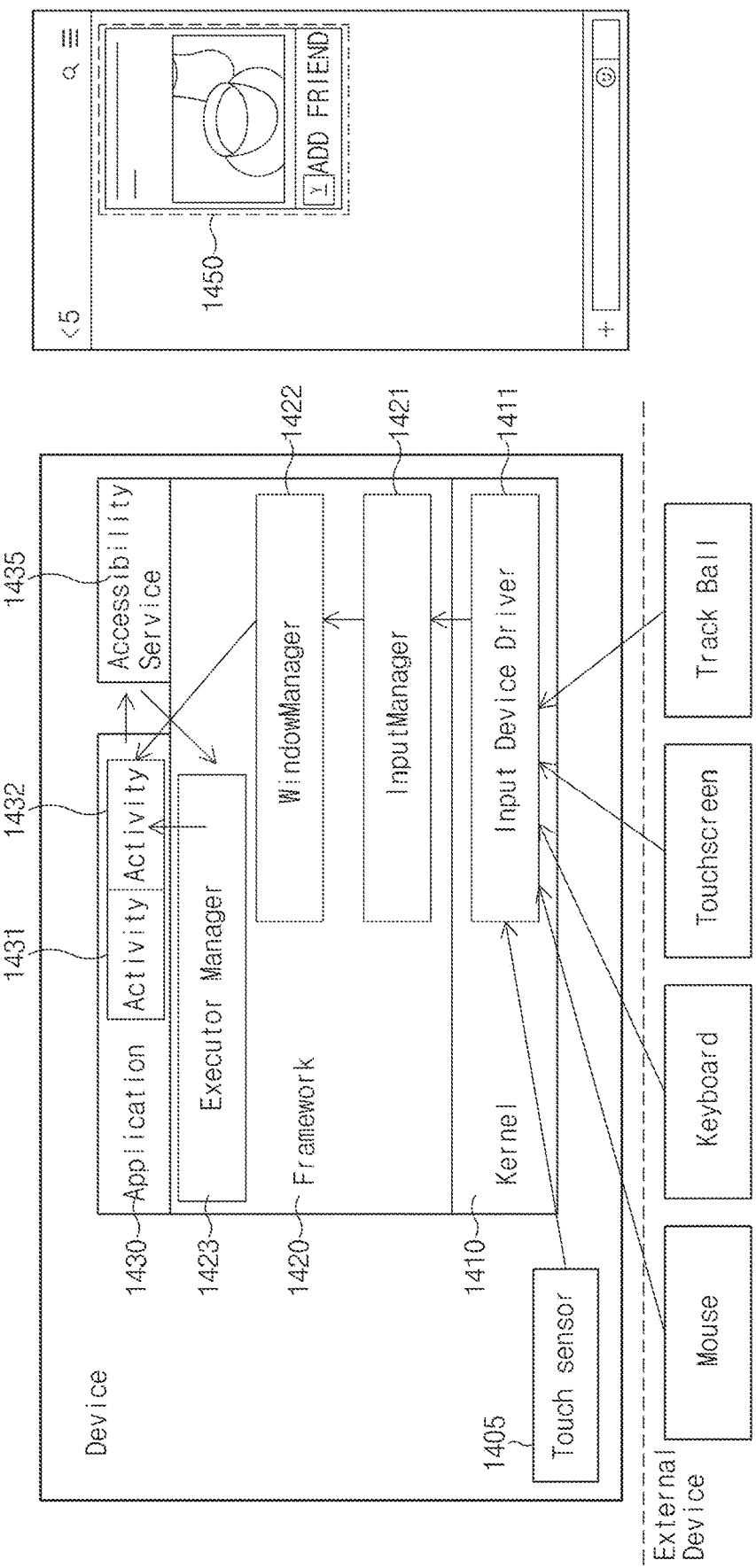
FIG. 14C is a configuration diagram of a program module of a user terminal operating in an assist mode according to an embodiment of the disclosure.

FIGS. 14A to 14C are configuration diagrams of a program module of a user terminal operating in an assist mode according to various embodiments of the disclosure. FIGS. 14A to 14C are, but are not limited to, examples.

Referring to FIG. 14A, when an intelligent app is executed, a processor (e.g., the processor 150 of FIG. 2) according to various embodiments may operate a running foreground app in an assist mode. In an embodiment of the disclosure, the processor 150 may generate an input interface (e.g., a transparent layer) for receiving an auxiliary input.

According to various embodiments of the disclosure, a kernel 1410 may include an input device driver 1411. The input device driver 1411 may transmit, to an input manager 1421 of a framework 1420, input information generated by a touch sensor 1405, an external mouse, an external keyboard, or the like.

According to various embodiments of the disclosure, the framework 1420 may include the input manager 1421, a window manager 1422, and an executor manager 1423. An application 1430 may include various activities 1431 and 1432 being executed. When entering the assist mode, the application 1430 may move from the currently activated activity 1432 to a fake activity 1433 to receive the auxiliary input. For example, when a touch input occurs on the transparent layer through the touch sensor 1405, the window manager 1422 may identify the fake activity 1433 as the currently activated activity to transmit pieces of information on a touch input generated by the touch sensor 1405.

According to various embodiments of the disclosure, the fake activity 1433 may identify the item, which the user wants to select, based on the coordinate value of the received touch input. The fake activity 1433 may temporarily store the identified item or may transmit the identified item to the executor manager 1423.

According to various embodiments of the disclosure, the executor manager 1423 may recognize the execution state of the application 1430 as the activity 1432 that has been previously activated, not the fake activity 1433. As such, when the utterance input and the identified item are transmitted to the intelligence server 200, the intelligence server 200 may operate without changing the state of the previously defined path rule.

Referring to FIG. 14B, when entering the assist mode according to various embodiments of the disclosure, the application 1430 may receive the auxiliary input in the activated activity 1432. For example, when a touch input occurs through the touch sensor 1405, the window manager 1422 may transmit pieces of information on a touch input to the currently activated activity 1432.

According to various embodiments of the disclosure, the application 1430 may be configured to operate the touch input differently from a touch input in a normal mode. For example, when the web page is in the normal mode, the short touch input may be mapped to an operation of moving to a link screen. When the web page is in the assist mode, the short touch input may be mapped to an operation of copying content (e.g., a text, an image, a link, or the like). When a user's utterance input (e.g., "send this link to Suji") occurs, the processor 150 may identify the content (e.g., a text, an image, a link, or the like) at a location corresponding to the short touch input or the long touch input, as an item.

Referring to FIG. 14C, when entering the assist mode according to various embodiments of the disclosure, the application 1430 may receive the auxiliary input in the activated activity 1432. For example, when a touch input occurs through the touch sensor 1405, the window manager 1422 may transmit pieces of information on a touch input to the activated activity 1432.

According to various embodiments of the disclosure, in the assist mode, the application 1430 may identify the item corresponding to the auxiliary input through an accessibility service 1435 for people with low vision. When a button is clicked or a view is focused, clicked, long-clicked, selected, text-changed, scrolled, or hovered, the accessibility service 1435 may collect an event type, a package name, a text, an index, an item count, an event, time, or the like.

According to various embodiments of the disclosure, when content (e.g., a text, an image, a check box, or the like) is selected through an auxiliary input, such as a touch/hovering of the user, the accessibility service 1435 may identify the selected or focused item 1450 to transmit the identified item 1450 to the executor manager 1423.

According to various embodiments of the disclosure, the executor manager 1423 may internally store the identified item 1450 or transmit the identified item 1450 to the intelligence server 200 and then may perform a function corresponding to the user's utterance input (e.g., "send this message to Jane").

Figure 15A:
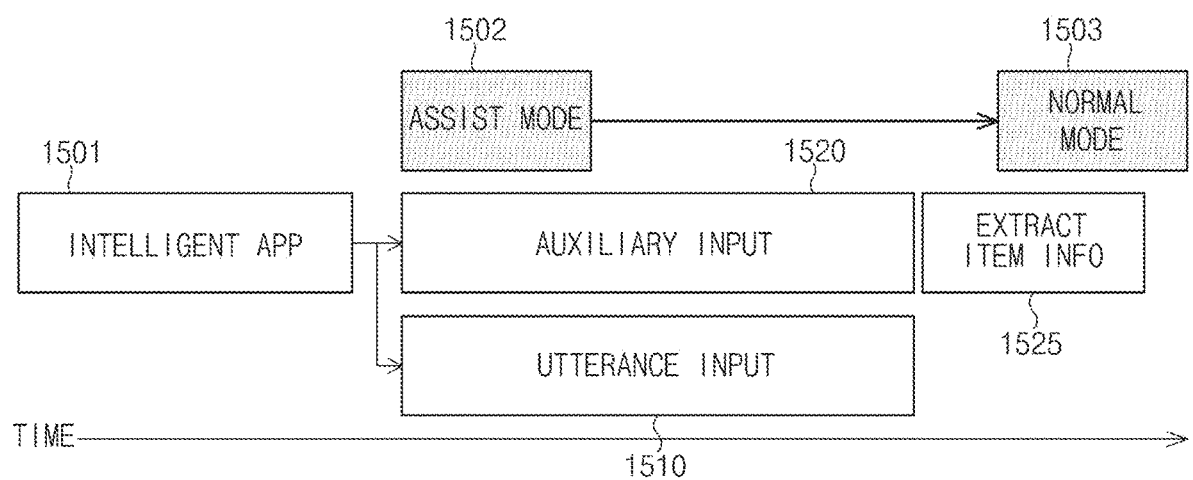
FIG. 15A is a diagram illustrating an operation of an assist mode according to simultaneous occurrence of an utterance input and an auxiliary input according to an embodiment of the disclosure.

FIG. 15A is a diagram illustrating an operation of an assist mode according to simultaneous occurrence of an utterance input and an auxiliary input according to an embodiment of the disclosure.

Referring to FIG. 15A, in operation 1501, a processor (e.g., the processor 150 of FIG. 2) according to various embodiments may execute an intelligent app. The processor 150 may operate a running foreground app in an assist mode 1502 by a triggering input or automatically.

According to various embodiments of the disclosure, in the assist mode 1502, an utterance input 1510 and an auxiliary input 1520 may occur at the same time. For example, the processor 150 may receive the user's utterance input while receiving a touch pen input via a display (the display 120 of FIG. 2).

According to various embodiments of the disclosure, when the user's utterance input 1510 is started, the processor 150 may receive the auxiliary input 1520 by displaying an input interface, through which the user is capable of selecting an item. In operation 1525, the processor 150 may extract the item based on the auxiliary input 1520.

According to various embodiments of the disclosure, when both the utterance input 1510 and the auxiliary input 1520 are terminated, the mode of the processor 150 may be switched to a normal mode 1503.

Figure 15B:
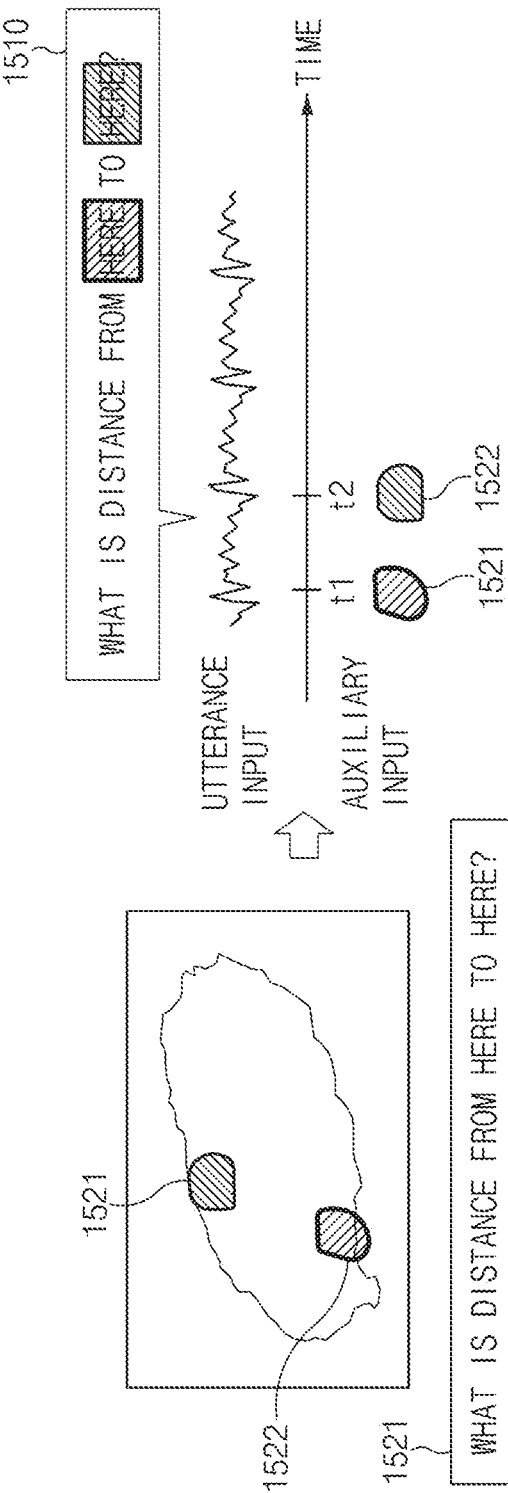
FIG. 15B is a diagram illustrating an operation of an assist mode according to occurrence of an utterance input and a plurality of auxiliary inputs according to an embodiment of the disclosure.

FIG. 15B is a diagram illustrating an operation of an assist mode according to occurrence of an utterance input and a plurality of auxiliary inputs according to an embodiment of the disclosure.

Referring to FIG. 15B, in an assist mode, an utterance input and a plurality of auxiliary inputs may occur at the same time. For example, while an utterance input (e.g., "what is the distance from here to here") 1510 is entered, when a first touch input 1521 occurs at time t1 at which the first 'here' is uttered and when a second touch input 1522 occurs at time t2 at which the second 'here' is uttered, a processor (e.g., the processor 150 of FIG. 2) may identify the first item associated with the first 'here' based on the first touch input 1521 and may identify the second item associated with the second 'here' based on the second touch input 1522.

According to various embodiments of the disclosure, the processor 150 may transmit, to the intelligence server 200, the occurrence time of the utterance input and the occurrence time (t1 and t2) of the first touch input 1521 and the second touch input 1522.

Figure 15C:
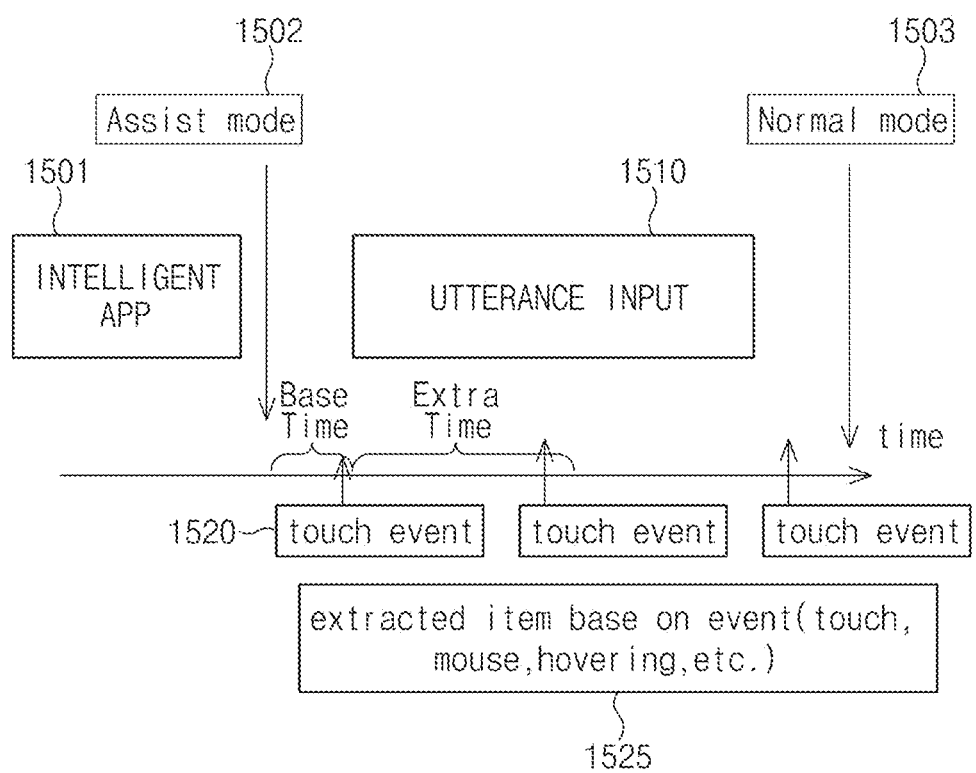
FIG. 15C is a diagram illustrating processing according to an occurrence time difference between an utterance input and an auxiliary input according to an embodiment of the disclosure.

FIG. 15C is a diagram illustrating processing according to an occurrence time difference between an utterance input and an auxiliary input according to an embodiment of the disclosure.

Referring to FIG. 15C, in operation 1501, a processor (e.g., the processor 150 of FIG. 2) may execute an intelligent app. The processor 150 may operate a running foreground app in an assist mode 1502 by a triggering input or automatically.

According to various embodiments of the disclosure, in the assist mode 1502, the auxiliary input (e.g., touch input) 1520 may occur prior to the utterance input 1510. The processor 150 may identify the switch to a normal mode, based on a predetermined default time. For example, after entering the assist mode 1502, when the auxiliary input (e.g., touch input) 1520 of a user does not occur during the default time, the mode of the processor 150 may be switched to the normal mode 1503 after the default time elapses.

According to various embodiments of the disclosure, when the auxiliary input 1520 occurs during the default time, the mode of the processor 150 may be switched from the assist mode 1502 to the normal mode 1503, based on the default time and an extra time.

According to various embodiments of the disclosure, the processor 150 may extract the item based on the auxiliary input 1520.

According to various embodiments of the disclosure, the mode of the processor 150 may be switched from the assist mode 1502 to the normal mode 1503, based on a point in time when the utterance input 1510 is terminated. After a specific time stands by at the point in time when the utterance input 1510 is terminated, the mode of the processor 150 may be switched to the normal mode 1503. When the auxiliary input 1520 occurs during the standby time, in operation 1525, the processor 150 may extract an item based on the auxiliary input.

According to an embodiment of the disclosure, when both the utterance input 1510 and the auxiliary input 1520 are terminated, the processor 150 may transmit, to the intelligence server 200, the item identified based on the utterance input 1510 and the auxiliary input 1520.

According to an embodiment of the disclosure, when the utterance input 1510 is terminated first, the processor 150 may transmit the utterance input 1510 to the intelligence server 200. Afterward, when the item is identified based on the auxiliary input 1520, the processor 150 may transmit the identified item to the intelligence server 200.

According to various embodiments of the disclosure, the mode of the processor 150 may be switched from the assist mode to the normal mode, based on a separate user input. For example, when the user touches a return button provided in the assist mode 1502, the mode of the processor 150 may be switched to the normal mode. Alternatively, when a specified time elapses after the processor 150 enters the assist mode, the mode of the processor 150 may be automatically switched to the normal mode.

Figure 16A:
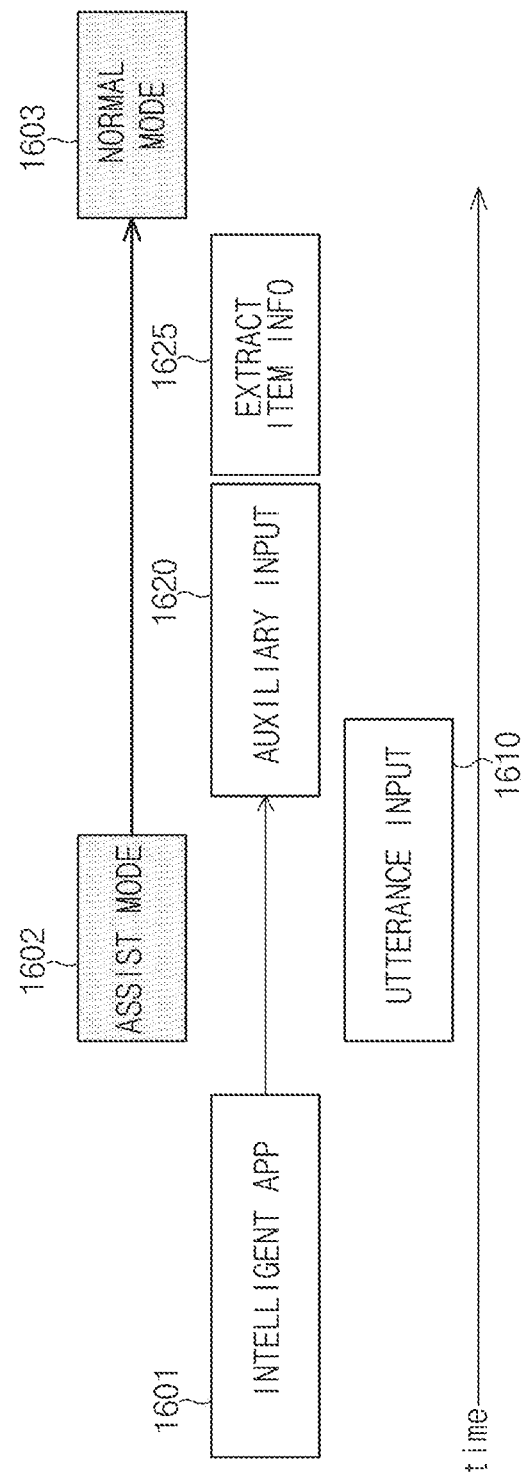
FIG. 16A is a diagram illustrating an operation of an assist mode in which an auxiliary input occurs before an utterance input according to an embodiment of the disclosure.

FIG. 16A is a diagram illustrating an operation of an assist mode in which an auxiliary input occurs before an utterance input according to an embodiment of the disclosure.

Referring to FIG. 16A, in operation 1601, a processor (e.g., the processor 150 of FIG. 2) may execute an intelligent app. The processor 150 may operate a running foreground app in an assist mode 1602 by a triggering input or automatically.

According to various embodiments of the disclosure, in an assist mode 1602, an utterance input 1610 may occur and then may be terminated before an auxiliary input 1620. After the utterance input 1610 of a user occurs and then is terminated, the processor 150 may receive the auxiliary input 1620 using a touch pen. For example, after the utterance input 1610 saying that "move these images to folder A" is terminated, the processor 150 may receive a touch input to select an item (e.g., an image, a text, or the like) displayed on a display (the display 120 of FIG. 2).

According to various embodiments of the disclosure, the processor 150 may extract an item info 1625 based on the auxiliary input 1620, and when the determination of an item is completed based on the auxiliary input 1620, the mode of the processor 150 may be switched to a normal mode 1603.

Figure 16B:
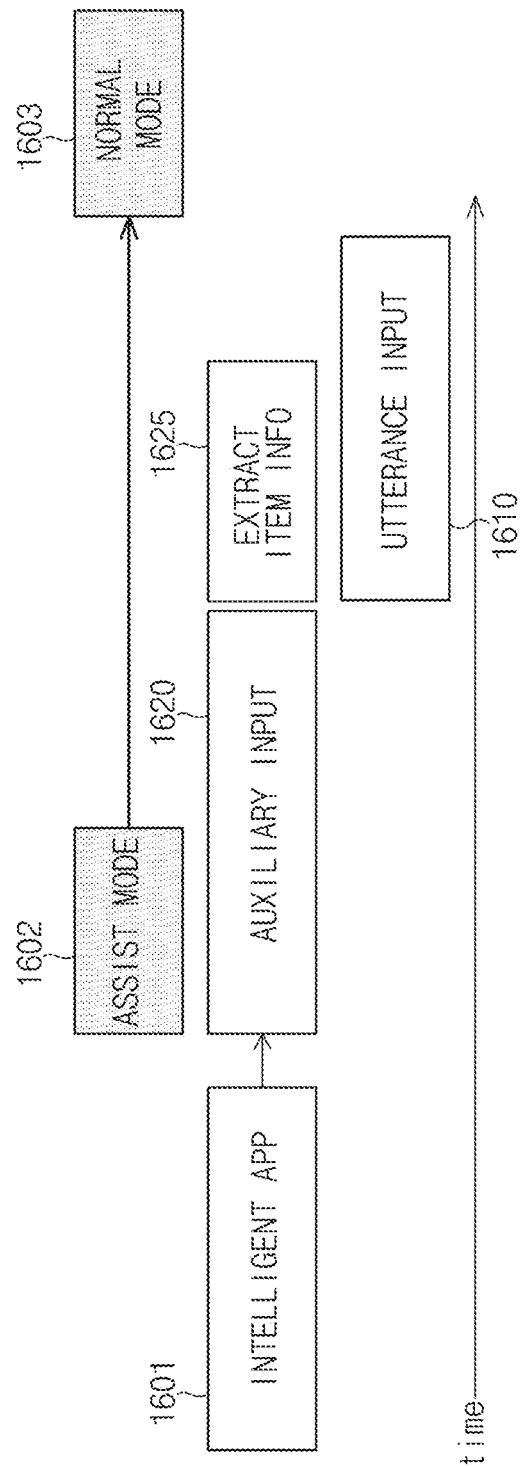
FIG. 16B is a diagram illustrating an operation of an assist mode in which an auxiliary input occurs before an utterance input according to an embodiment of the disclosure.

FIG. 16B is a diagram illustrating an operation of an assist mode in which an auxiliary input occurs before an utterance input according to an embodiment of the disclosure.

Referring to FIG. 16B, in operation 1601, a processor (e.g., the processor 150 of FIG. 2) may execute an intelligent app. The processor 150 may operate a running foreground app in an assist mode 1602 by a triggering input or automatically.

According to various embodiments of the disclosure, in the assist mode 1602, the auxiliary input 1620 may occur and may be terminated before the utterance input 1610. After the auxiliary input 1620 occurs and then is terminated, the processor 150 may receive the utterance input 1610. For example, after a touch input to select an item (e.g., an image, a text, or the like) displayed on a display (the display 120 of FIG. 2) is terminated, the processor 150 may receive the utterance input 1610 saying that "move these images to folder A".

According to various embodiments of the disclosure, in operation 1625, the processor 150 may identify information on an item based on the auxiliary input 1620. The processor 150 may receive the utterance input 1610 in a process to identify an item. When the utterance input 1610 is completed, the mode of the processor 150 may be switched to the normal mode 1603.

According to various embodiments of the disclosure, after the processor 150 receives the auxiliary input 1620, when the utterance input 1610 does not occur during the pre-defined time, the processor 150 may terminate the assist mode 1602 and then the processor 150 may switch the mode to the normal mode 1603 automatically or after a user notification.

Figure 17:
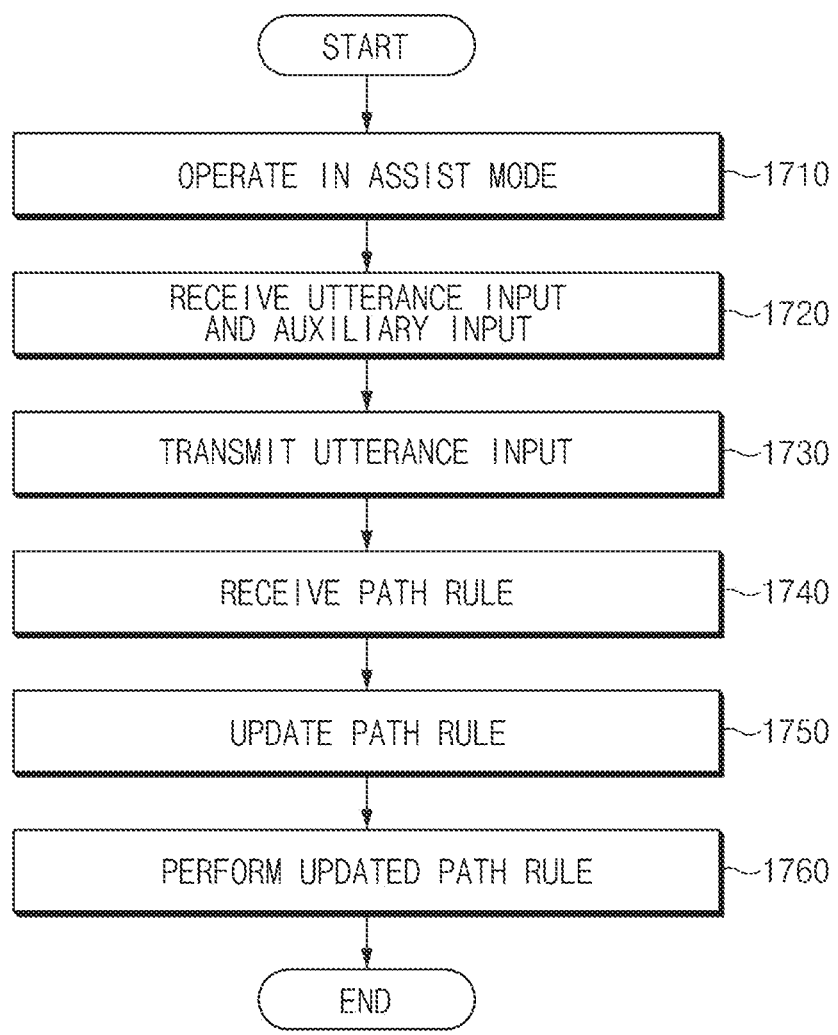
FIG. 17 is a flowchart illustrating processing of an item in a user terminal according to an embodiment of the disclosure.

FIG. 17 is a flowchart illustrating processing of an item in a user terminal according to an embodiment of the disclosure.

Referring to FIG. 17, in operation 1710, a processor (e.g., the processor 150 of FIG. 2) according to various embodiments may allow a running foreground app to operate in an assist mode by a triggering input or automatically.

According to various embodiments of the disclosure, in operation 1720, the processor 150 may receive an utterance input and an auxiliary input. The processor 150 may process the item identified via the auxiliary input, in the electronic device 101 instead of transmitting the item identified via the auxiliary input to the intelligence server 200.

According to various embodiments of the disclosure, the processor 150 may store the item identified via the auxiliary input, in a memory (e.g., the memory 140 of FIG. 2) of the electronic device 101.

According to various embodiments of the disclosure, in operation 1730, the processor 150 may transmit the utterance input to the intelligence server 200.

According to various embodiments of the disclosure, in operation 1740, the processor 150 may receive a path rule from the intelligence server 200.

According to various embodiments of the disclosure, when an essential parameter for completing an operation according to the path rule in an application is empty, in operation 1750, the processor 150 may load an item, which is stored temporarily in the memory 140, to update the path rule.

For example, there may be no information on "these photos" in a path rule corresponding to an utterance input saying that "send these photos to Emma". The processor 150 may combine the item stored in the memory 140 to the path rule.

According to various embodiments of the disclosure, in operation 1760, the processor 150 may perform the updated path rule.

According to various embodiments of the disclosure, the processor 150 may identify the attribute of the empty essential parameter; when the attribute of the stored item is the same as the attribute of the empty essential parameter, the processor 150 may update the path rule. For example, when the attribute of the empty essential parameter is a location attribute, the processor 150 may apply an item corresponding to location information (e.g., latitude/longitude or POI) to the path rule.

Figure 18:
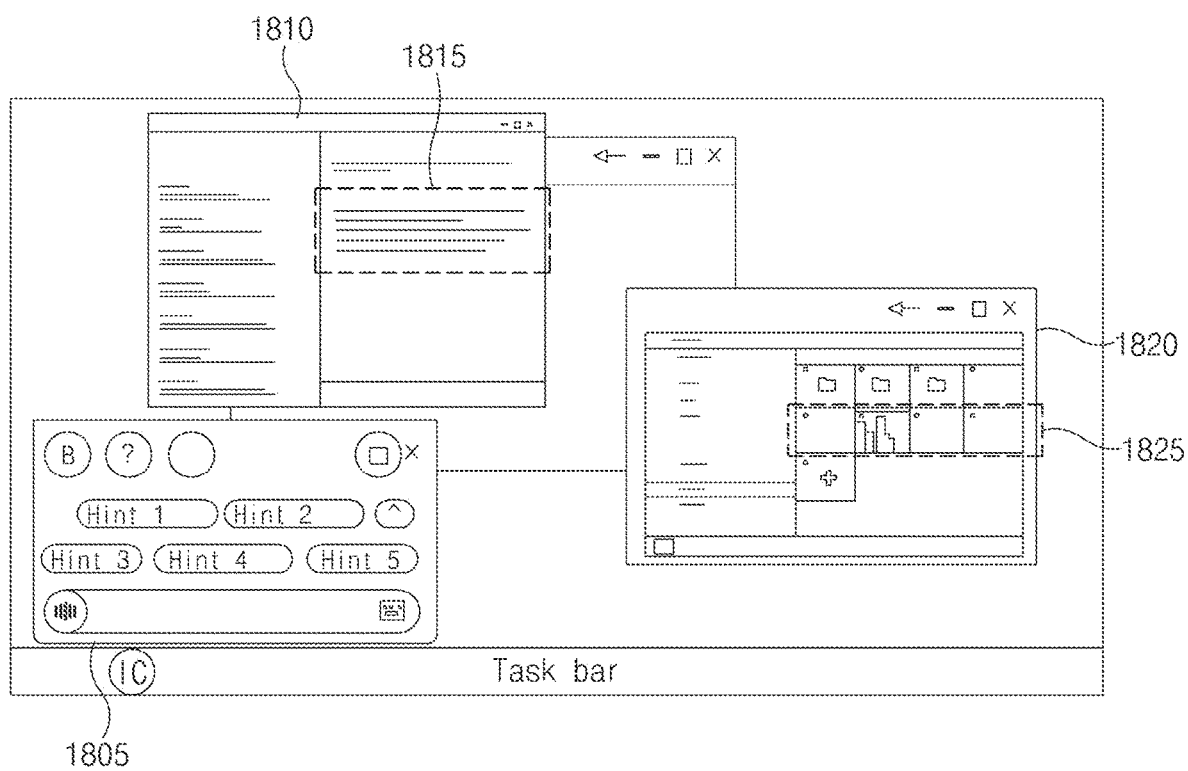
FIG. 18 is a screen view illustrating an assist mode in multi-window according to an embodiment of the disclosure.

FIG. 18 is a screen view illustrating an assist mode in multi-window according to an embodiment of the disclosure.

Referring to FIG. 18, a processor (e.g., the processor 150 of FIG. 2) of a user terminal (e.g., the user terminal 100 of FIG. 1) may support multi-window. The processor 150 may execute a plurality of applications at the same time; the processor 150 may output the execution windows of applications independently of one another or may output the execution windows of the applications so as at least partly to overlap with one another. The processor 150 may maintain the execution windows of one or more applications in an activation state.

According to various embodiments of the disclosure, the processor 150 may change the mode of an application activated on a screen to an assist mode. The processor 150 may receive an input interface auxiliary input, in an application, the mode of which is switched to the assist mode.

According to various embodiments of the disclosure, the processor 150 may receive the auxiliary input, such as an input interface touch input, a mouse drag input, or the like. The processor 150 may identify an item based on the received auxiliary input.

For example, the processor 150 may be in a state where an e-mail app 1810 and a folder app 1820 are being executed. The processor 150 may execute an intelligent app, by a triggering input or automatically. The processor 150 may display a UI 1805 of the intelligent app on at least part of a display (e.g., the display 120 of FIG. 2).

In the input interface 1805, for example, when a user selects a part of a file 1825 included in the folder app 1820 via a mouse drag input and generates an utterance input saying that "attach this file to an e-mail", the processor 150 may identify information (e.g., a file name or a file storage location) on the files selected by the mouse drag input, as an item.

For another example, when the user selects a text 1815 included in the e-mail app 1810 via a mouse drag input and generates an utterance input saying that "copy this text and save it to My file folder", the processor 150 may copy the text selected by the mouse drag input to identify the copied text as an item.

According to various embodiments of the disclosure, the processor 150 may store the identified item in an internal memory or may transmit the identified item to the external intelligence server 200 and may use the identified item to perform an operation corresponding to the utterance input.

Figure 19:
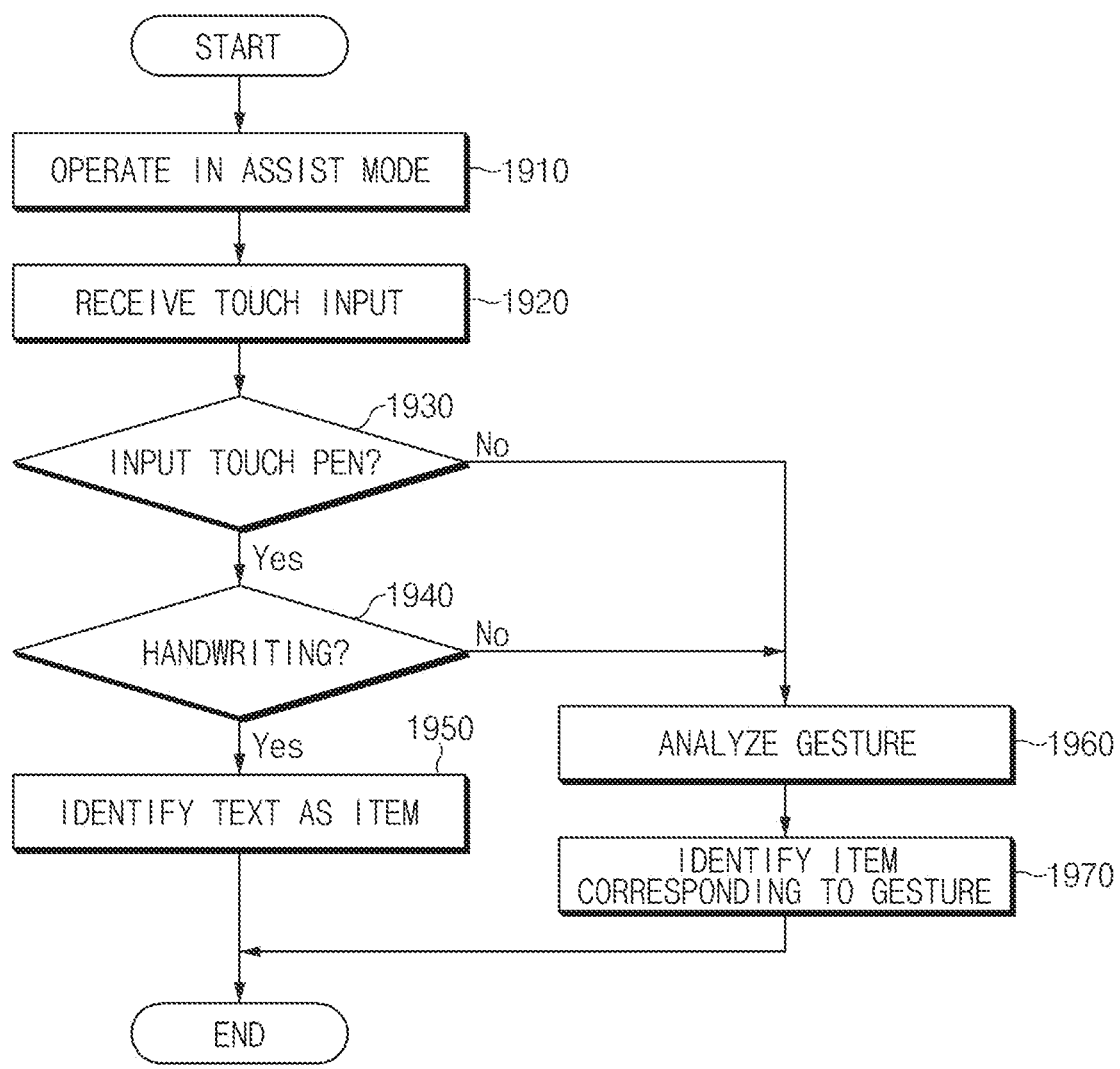
FIG. 19 is a flowchart illustrating a procedure for processing a touch input in an assist mode according to an embodiment of the disclosure.

FIG. 19 is a flowchart illustrating a procedure for processing a touch input in an assist mode according to an embodiment of the disclosure.

Referring to FIG. 19, in operation 1910, a processor (e.g., the processor 150 of FIG. 2) according to various embodiments may allow a running foreground app to operate in an assist mode 1502 by a triggering input or automatically.

According to various embodiments of the disclosure, in operation 1920, the processor 150 may receive a touch input. In an embodiment of the disclosure, the touch input may be a touch using a user's body part or a touch using a touch pen. The processor 150 may analyze a touch input, using point information, location information, stroke information, or the like.

According to various embodiments of the disclosure, in operation 1930, the processor 150 may identify whether the touch input is a touch pen input using the touch pen.

According to various embodiments of the disclosure, in operation 1940, the processor 150 may identify whether the touch pen input is handwriting, when the touch input is a touch pen input using the touch pen.

According to various embodiments of the disclosure, in operation 1950, the processor 150 may identify the corresponding text as an item, when the touch pen input is handwriting. For example, the processor 150 may identify whether the touch pen input is an English text, a Korean text, a Japanese text, or a Chinese text (Chinese character).

According to various embodiments of the disclosure, in operation 1960, the processor 150 may analyze the gesture of a touch pen input to identify the type of a gesture, when the touch pen input is not handwriting. For example, the processor 150 may identify whether the touch pen input is a tap input, a circle/ellipse input, a line, a check mark, or an input, the type of which is not capable of being specified.

According to various embodiments of the disclosure, in operation 1970, the processor 150 may identify the item corresponding to the analyzed gesture. For example, the processor 150 may identify the name of an image file corresponding to a check mark, as an item.

Figure 20:
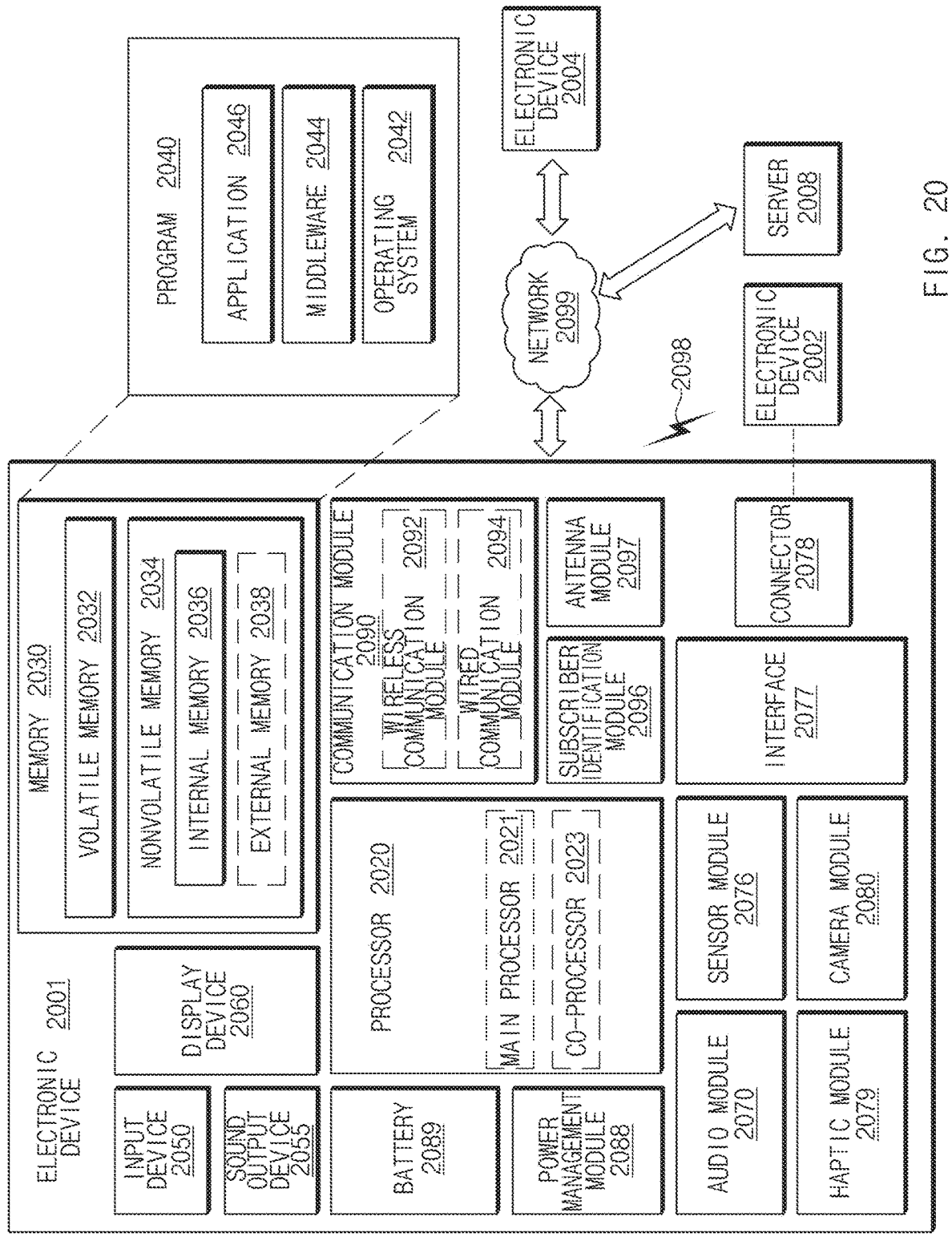
FIG. 20 is a block diagram of an electronic device in a network environment according to an embodiment of the disclosure.

FIG. 20 is a block diagram illustrating an electronic device in a network environment according to an embodiment of the disclosure.

Referring to FIG. 20, an electronic device 2001 in the network environment may communicate with an electronic device 2002 via a first network 2098 (e.g., a short-range wireless communication network), or an electronic device 2004 or a server 2008 via a second network 2099 (e.g., a long-range wireless communication network). According to an embodiment, the electronic device 2001 may communicate with the electronic device 2004 via the server 2008. According to an embodiment, the electronic device 2001 may include a processor 2020, memory 2030, an input device 2050, a sound output device 2055, a display device 2060, an audio module 2070, a sensor module 2076, an interface 2077, a haptic module 2079, a camera module 2080, a power management module 2088, a battery 2089, a communication module 2090, a subscriber identification module (SIM) 2096, or an antenna module 2097. In some embodiments, at least one (e.g., the display device 2060 or the camera module 2080) of the components may be omitted from the electronic device 2001, or one or more other components may be added in the electronic device 2001. In some embodiments, some of the components may be implemented as single integrated circuitry. For example, the sensor module 2076 (e.g., a fingerprint sensor, an iris sensor, or an illuminance sensor) may be implemented as embedded in the display device 2060 (e.g., a display).

The processor 2020 may execute, for example, software (e.g., a program 2040) to control at least one other component (e.g., a hardware or software component) of the electronic device 2001 coupled with the processor 2020, and may perform various data processing or computation. According to one embodiment, as at least part of the data processing or computation, the processor 2020 may load a command or data received from another component (e.g., the sensor module 2076 or the communication module 2090) in volatile memory 2032, process the command or the data stored in the volatile memory 2032, and store resulting data in non-volatile memory 2034. According to an embodiment, the processor 2020 may include a main processor 2021 (e.g., a central processing unit (CPU) or an application processor (AP)), and an auxiliary processor 2023 (e.g., a graphics processing unit (GPU), an image signal processor (ISP), a sensor hub processor, or a communication processor (CP)) that is operable independently from, or in conjunction with, the main processor 2021. Additionally or alternatively, the auxiliary processor 2023 may be adapted to consume less power than the main processor 2021, or to be specific to a specified function. The auxiliary processor 2023 may be implemented as separate from, or as part of the main processor 2021.

The auxiliary processor 2023 may control at least some of functions or states related to at least one component (e.g., the display device 2060, the sensor module 2076, or the communication module 2090) among the components of the electronic device 2001, instead of the main processor 2021 while the main processor 2021 is in an inactive (e.g., sleep) state, or together with the main processor 2021 while the main processor 2021 is in an active state (e.g., executing an application). According to an embodiment, the auxiliary processor 2023 (e.g., an ISP or a CP) may be implemented as part of another component (e.g., the camera module 2080 or the communication module 2090) functionally related to the auxiliary processor 2023.

The memory 2030 may store various data used by at least one component (e.g., the processor 2020 or the sensor module 2076) of the electronic device 2001. The various data may include, for example, software (e.g., the program 2040) and input data or output data for a command related thereto. The memory 2030 may include the volatile memory 2032 or the non-volatile memory 2034.

The program 2040 may be stored in the memory 2030 as software, and may include, for example, an operating system (OS) 2042, middleware 2044, or an application 2046.

The input device 2050 may receive a command or data to be used by another component (e.g., the processor 2020) of the electronic device 2001, from the outside (e.g., a user) of the electronic device 2001. The input device 2050 may include, for example, a microphone, a mouse, a keyboard, or a digital pen (e.g., a stylus pen).

The sound output device 2055 may output sound signals to the outside of the electronic device 2001. The sound output device 2055 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 2060 may visually provide information to the outside (e.g., a user) of the electronic device 2001. The display device 2060 may include, for example, a display, a hologram device, or a projector and control circuitry to control a corresponding one of the display, hologram device, and projector. According to an embodiment, the display device 2060 may include touch circuitry adapted to detect a touch, or sensor circuitry (e.g., a pressure sensor) adapted to measure the intensity of force incurred by the touch.

The audio module 2070 may convert a sound into an electrical signal and vice versa. According to an embodiment, the audio module 2070 may obtain the sound via the input device 2050, or output the sound via the sound output device 2055 or a headphone of an external electronic device (e.g., an electronic device 2002) directly (e.g., wiredly) or wirelessly coupled with the electronic device 2001.

The sensor module 2076 may detect an operational state (e.g., power or temperature) of the electronic device 2001 or an environmental state (e.g., a state of a user) external to the electronic device 2001, and then generate an electrical signal or data value corresponding to the detected state. According to an embodiment, the sensor module 2076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2077 may support one or more specified protocols to be used for the electronic device 2001 to be coupled with the external electronic device (e.g., the electronic device 2002) directly (e.g., wiredly) or wirelessly. According to an embodiment, the interface 2077 may include, for example, a high definition multimedia interface (HDMI), a universal serial bus (USB) interface, a secure digital (SD) card interface, or an audio interface.

A connector 2078 may include a connector via which the electronic device 2001 may be physically connected with the external electronic device (e.g., the electronic device 2002). According to an embodiment, the connector 2078 may include, for example, a HDMI connector, a USB connector, a SD card connector, or an audio connector (e.g., a headphone connector).

The haptic module 2079 may convert an electrical signal into a mechanical stimulus (e.g., a vibration or a movement) or electrical stimulus which may be recognized by a user via his tactile sensation or kinesthetic sensation. According to an embodiment, the haptic module 2079 may include, for example, a motor, a piezoelectric element, or an electric stimulator.

The camera module 2080 may capture a still image or moving images. According to an embodiment, the camera module 2080 may include one or more lenses, image sensors, image signal processors, or flashes.

The power management module 2088 may manage power supplied to the electronic device 2001. According to one embodiment, the power management module 2088 may be implemented as at least part of, for example, a power management integrated circuit (PMIC).

The battery 2089 may supply power to at least one component of the electronic device 2001. According to an embodiment, the battery 2089 may include, for example, a primary cell which is not rechargeable, a secondary cell which is rechargeable, or a fuel cell.

The communication module 2090 may support establishing a direct (e.g., wired) communication channel or a wireless communication channel between the electronic device 2001 and the external electronic device (e.g., the electronic device 2002, the electronic device 2004, or the server 2008) and performing communication via the established communication channel. The communication module 2090 may include one or more CPs that are operable independently from the processor 2020 (e.g., the AP) and supports a direct (e.g., wired) communication or a wireless communication. According to an embodiment, the communication module 2090 may include a wireless communication module 2092 (e.g., a cellular communication module, a short-range wireless communication module, or a global navigation satellite system (GNSS) communication module) or a wired communication module 2094 (e.g., a local area network (LAN) communication module or a power line communication (PLC) module). A corresponding one of these communication modules may communicate with the external electronic device via the first network 2098 (e.g., a short-range communication network, such as Bluetooth™, wireless-fidelity (Wi-Fi) direct, or infrared data association (IrDA)) or the second network 2099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2092 may identify and authenticate the electronic device 2001 in a communication network, such as the first network 2098 or the second network 2099, using subscriber information (e.g., international mobile subscriber identity (IMSI)) stored in the subscriber identification module 2096.

The antenna module 2097 may transmit or receive a signal or power to or from the outside (e.g., the external electronic device) of the electronic device 2001. According to an embodiment, the antenna module 2097 may include an antenna including a radiating element composed of a conductive material or a conductive pattern formed in or on a substrate (e.g., PCB). According to an embodiment, the antenna module 2097 may include a plurality of antennas. In such a case, at least one antenna appropriate for a communication scheme used in the communication network, such as the first network 2098 or the second network 2099, may be selected, for example, by the communication module 2090 (e.g., the wireless communication module 2092) from the plurality of antennas. The signal or the power may then be transmitted or received between the communication module 2090 and the external electronic device via the selected at least one antenna. According to an embodiment, another component (e.g., a radio frequency integrated circuit (RFIC)) other than the radiating element may be additionally formed as part of the antenna module 2097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2001 and the external electronic device 2004 via the server 2008 coupled with the second network 2099. Each of the electronic devices 2002 and 2004 may be a device of a same type as, or a different type, from the electronic device 2001. According to an embodiment, all or some of operations to be executed at the electronic device 2001 may be executed at one or more of the external electronic devices 2002, 2004, or 2008. For example, if the electronic device 2001 should perform a function or a service automatically, or in response to a request from a user or another device, the electronic device 2001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2001. The electronic device 2001 may provide the outcome, with or without further processing of the outcome, as at least part of a reply to the request. To that end, a cloud computing, distributed computing, or client-server computing technology may be used, for example.

According to various embodiments of the disclosure, a system may include a microphone, a touchscreen display, at least one processor operatively connected to the microphone and the display, at least one memory operatively connected to the at least one processor. The memory may store instructions that, when executed, cause the at least one processor to receive a user utterance via the microphone, to display a UI on the display, to receive a touch or gesture input associated with the UI via the display, to identify at least one item associated with the user interface, based at least partly on the touch or gesture input, to identify an intent based at least partly on the user utterance, to identify at least one parameter using at least part of the at least one item, and to provide a response, based at least partly on the intent and the at least one parameter.

According to various embodiments of the disclosure, the system may include a client device including the microphone, the touchscreen display, and a first processor, and a first memory, and a server including a second processor and a second memory. The first memory may store first instructions that, when executed, cause the first processor to receive the user utterance via the microphone, to display the UI on the display, to receive the touch or gesture input associated with the UI via the display, to identify the at least one item associated with the user interface, based at least partly on the touch or gesture input, and to provide data associated with the user utterance and the at least one item to the server.

According to various embodiments of the disclosure, the second memory may store second instructions that, when executed, cause the second processor to receive the data, to identify the intent based at least partly on the user utterance, to identify the at least one parameter using the at least part of the at least one item, and to provide the response to the client device.

According to various embodiments of the disclosure, the UI may include a map, and the at least one item may include at least one of a geographical coordinate, a point of interest, or address that selected by the touch or gesture input.

According to various embodiments of the disclosure, the UI may include a plurality of images, and the at least one item may include information on one of the images selected by the touch or gesture input.

According to various embodiments of the disclosure, the instructions, when executed, may cause the processor to generate an input interface on the UI displayed on the display, and the input interface may include a transparent layer.

According to various embodiments of the disclosure, the instructions, when executed, may cause the processor to receive the touch or gesture input associated with the user interface, via the input interface and to identify the at least one item associated with the user interface, based at least partly on the touch or gesture input.

According to various embodiments of the disclosure, the instructions, when executed, may cause the processor to map the touch or gesture input to an operation different from an operation defined in a running application.

According to various embodiments of the disclosure, the touch or gesture input may include a plurality of user inputs, and the instructions, when executed, may cause the processor to identify each of the at least one item based on each time point when each of the plurality of user inputs occurs, when the plurality of user inputs occur while the user utterance occurs.

According to various embodiments of the disclosure, an electronic device may include a microphone, a display operating as a touchscreen, a communication circuit transmitting or receiving data to or from an external server, a memory, and a processor. The processor may be configured to receive a part of an utterance input based on a user voice received via the microphone, at a first time, to receive a first auxiliary input via the display or an external input device, within a specified time interval from the first time, to identify at least one first item associated with the part of the utterance input, based on the first auxiliary input, to identify a rule associated with execution of one or more applications based on the utterance input and the first item, and to execute the one or more applications based on the rule.

According to various embodiments of the disclosure, the processor may be configured to receive another part of the utterance input, at a second time, to receive a second auxiliary input via the display or the external input device, within the specified time interval from the second time, to identify at least one second item associated with the other part of the utterance input, based on the second auxiliary input, and to identify a rule based on the utterance input, the first item, and the second item.

According to various embodiments of the disclosure, the processor may be configured to generate an input interface on a UI displayed on the display, and the input interface may include a transparent layer.

According to various embodiments of the disclosure, the processor may be configured to receive a touch or gesture input associated with the user interface, via the input interface and to identify the at least one first item associated with the user interface, based at least partly on the touch or gesture input.

According to various embodiments of the disclosure, the processor may be configured to identify the at least one first item based on a layout of a running application corresponding to a location of the touch or gesture input.

According to various embodiments of the disclosure, the processor may be configured to map the second auxiliary input to an operation different from an operation defined in a running application.

According to various embodiments of the disclosure, the processor may be configured to transmit the identified first item to the external server. Alternatively, the processor may be configured to store the identified first item in the memory and to combine the first item to the rule when receiving the rule from the external server.

According to various embodiments of the disclosure, an application executing method performed in an electronic device may include receiving a part of an utterance input based on a user voice received via a microphone, at a first time, receiving a first auxiliary input via a display or an external input device, within a specified time interval from the first time, determining at least one first item associated with the part of the utterance input, based on the first auxiliary input, identifying a rule associated with execution of one or more applications based on the utterance input and the first item, and executing the one or more applications based on the rule.

According to various embodiments of the disclosure, the receiving of the first auxiliary input may include receiving another part of the utterance input, at a second time and receiving a second auxiliary input via the display or the external input device, within the specified time interval from the second time.

According to various embodiments of the disclosure, a recording medium may record instructions of a method executable by a processor of an electronic device. The instructions may cause the processor to perform receiving a part of an utterance input based on a user voice received via a microphone of the electronic device, at a first time, receiving a first auxiliary input via a display or an external input device, within a specified time interval from the first time, determining at least one first item associated with the part of the utterance input, based on the first auxiliary input, identifying a rule associated with execution of one or more applications based on the utterance input and the first item, and executing the one or more applications based on the rule.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2040) including one or more instructions that are stored in a storage medium (e.g., internal memory 2036 or external memory 2038) that is readable by a machine (e.g., the electronic device 2001). For example, a processor (e.g., the processor 2020) of the machine (e.g., the electronic device 2001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a microphone;
a display configured to operate as a touchscreen;
a communication circuit configured to transmit or receive data to or from an external server;
a memory; and
a processor,
wherein the processor is configured to:
execute a first application and a second application in a first mode corresponding to a mode for recognizing only an utterance input of a user,
recognize a specified user input for entering a second mode corresponding to a mode for recognizing the utterance input and an auxiliary input of the user together,
operate the first application and the second application in the second mode based on the recognized specified user input,
receive an utterance input based on a user voice of the user received via the microphone in the second mode in which the second application is operated in a background state,
identify a first unspecified parameter corresponding to a part of the utterance input received at a first time, among a plurality of parameters for generating a rule corresponding to the utterance input,
receive a first auxiliary input via the display or an external input device, within a specified time interval from the first time,
identify at least one first item based on the first auxiliary input,
determine a parameter in place of the first unspecified parameter based on the at least one first item,
identify the rule associated with at least one function of the first application based on the utterance input and the determined parameter,
operate the at least one function of the first application based on the identified rule, and
change the first application and the second application from the second mode to the first mode based on not receiving an auxiliary input from the user for a specified time.

2. The electronic device of claim 1, wherein the processor is further configured to:
identify a second unspecified parameter corresponding to another part of the utterance input received at a second time, among the plurality of parameters,
receive a second auxiliary input via the display or the external input device, within the specified time interval from the second time,
identify at least one second item based on the second auxiliary input,
determine another parameter in place of the second unspecified parameter based on the at least one second item, and
identify the rule based on the utterance input, the determined parameter, and the determined another parameter.

3. The electronic device of claim 2, wherein the processor is further configured to:
map the second auxiliary input to an operation different from an operation defined in a running application.

4. The electronic device of claim 1,
wherein the processor is further configured to:
generate an input interface on a user interface (UI) displayed on the display, and
wherein the input interface includes a transparent layer.

5. The electronic device of claim 4, wherein the processor is further configured to:
receive a touch or gesture input associated with the user interface, via the input interface, and
identify the at least one first item associated with the user interface, based at least partly on the touch or gesture input.

6. The electronic device of claim 5, wherein the processor is further configured to:
identify the at least one first item based on a layout of a running application corresponding to a location of the touch or gesture input.

7. The electronic device of claim 1, wherein the processor is further configured to:
transmit the identified first item to the external server.

8. The electronic device of claim 1, wherein the processor is further configured to:
store the identified first item in the memory, and
when receiving the rule from the external server, combine the first item to the rule.

9. An application executing method performed in an electronic device, the method comprising:
executing a first application and a second application in a first mode corresponding to a mode for recognizing only an utterance input of a user;
recognizing a specified user input for entering a second mode corresponding to a mode for recognizing the utterance input and an auxiliary input of the user together;
operating the first application and the second application in the second mode based on the recognized specified user input;
receiving an utterance input based on a user voice of the user received via a microphone in the second mode in which the second application is operated in a background state;
identifying a first unspecified parameter corresponding to a part of the utterance input received at a first time, among a plurality of parameters for generating a rule corresponding to the utterance input;
receiving a first auxiliary input via a display or an external input device, within a specified time interval from the first time;
identifying at least one first item based on the first auxiliary input;
determining a parameter in place of the first unspecified parameter based on the at least one first item;
identifying the rule associated with at least one function of the first application based on the utterance input and the determined parameter;
operating the at least one function of the first application based on the identified rule; and changing the first application and the second application from the second mode to the first mode based on not receiving an auxiliary input from the user for a specified time.

10. The method of claim 9, further comprising:
identifying a second unspecified parameter corresponding to another part of the utterance input received at a second time, among the plurality of parameters;
receiving a second auxiliary input via the display or the external input device, within the specified time interval from the second time;
identifying at least one second item based on the second auxiliary input; and
determining another parameter in place of the second unspecified parameter based on the at least one second item,
wherein the identifying the rule associated with execution of one or more applications comprises:
identifying the rule based on the utterance input, the determined parameter, and the determined another parameter.

11. A non-transitory recording medium recording instructions of a method executable by a processor of an electronic device, wherein the instructions cause the processor to perform:
executing a first application and a second application in a first mode corresponding to a mode for recognizing only an utterance input of a user;
recognizing a specified user input for entering a second mode corresponding to a mode for recognizing the utterance input and an auxiliary input of the user together;
operating the first application and the second application in the second mode based on the recognized specified user input;
receiving an utterance input based on a user voice of the user received via a microphone of the electronic device in the second mode in which the second application is operated in a background state;
identifying a unspecified parameter corresponding to a part of the utterance input received at a first time, among a plurality of parameters for generating a rule corresponding to the utterance input;
receiving a first auxiliary input via a display or an external input device, within a specified time interval from the first time;
determining at least one first item based on the first auxiliary input;
determining a parameter in place of the unspecified parameter based on the at least one first item;
identifying the rule associated with at least one function of the first application based on the utterance input and the determined parameter;
operating the at least one function of the first application based on the identified rule; and
changing the first application and the second application from the second mode to the first mode based on not receiving an auxiliary input from the user for a specified time.

* * * * *